(12) United States Patent
Karlsson

(10) Patent No.: US 11,068,945 B2
(45) Date of Patent: *Jul. 20, 2021

(54) SYSTEMS AND METHODS ASSOCIATED WITH ADAPTIVE REPRESENTATION OF A CONTROL/VOLUME RELATIONSHIP FOR A TACTIC GROUP

(71) Applicant: Oath (Americas) Inc., Dulles, VA (US)

(72) Inventor: Niklas Karlsson, Mountain View, CA (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,273

(22) Filed: Oct. 7, 2019

(65) Prior Publication Data

US 2020/0034889 A1 Jan. 30, 2020

Related U.S. Application Data

(63) Continuation of application No. 15/231,443, filed on Aug. 8, 2016, now Pat. No. 10,438,247.

(51) Int. Cl.
*G06Q 30/02* (2012.01)
(52) U.S. Cl.
CPC ..... *G06Q 30/0273* (2013.01); *G06Q 30/0277* (2013.01)
(58) Field of Classification Search
CPC .............. G06Q 30/0273; G06Q 30/0277
See application file for complete search history.

(56) References Cited

U.S. PATENT DOCUMENTS

| | | | |
|---|---|---|---|
| 8,826,123 B2* | 9/2014 | Audet | G06F 40/169 715/243 |
| 9,161,085 B2* | 10/2015 | Hodes | H04N 21/472 |
| 10,438,247 B2* | 10/2019 | Karlsson | G06Q 30/0277 |
| 2003/0139989 A1* | 7/2003 | Churquina | G06Q 40/04 705/35 |
| 2003/0206201 A1* | 11/2003 | Ly | G06Q 10/10 715/835 |
| 2004/0212636 A1* | 10/2004 | Stata | G06Q 10/109 715/703 |
| 2006/0200372 A1* | 9/2006 | O'Cull | G06Q 10/06312 705/7.22 |

(Continued)

*Primary Examiner* — Thomas C Lee
*Assistant Examiner* — Michael Tang
(74) *Attorney, Agent, or Firm* — Cooper Legal Group, LLC

(57) ABSTRACT

Embodiments of the present invention provide systems, methods, and computer storage media directed at adaptive representation of a control/volume relationship. In embodiments, a method may include receiving, from a control system, a request for control/volume relationship information of a target event for a tactic group. In response, a representation of a control/volume curve can be generated. The representation of the control/volume curve can include a number of control segments. In embodiments, the control segments included within the representation of the control/volume curve are determined based, at least in part, on one or more configuration parameters. The resulting representation of the control/volume curve can then be transmitted to a control system. Other embodiments may be described and/or claimed herein.

20 Claims, 14 Drawing Sheets

(56) References Cited

U.S. PATENT DOCUMENTS

| | | | |
|---|---|---|---|
| 2010/0079461 A1* | 4/2010 | Breeds | G06T 11/206 345/440 |
| 2010/0262455 A1* | 10/2010 | Karlsson | G06Q 30/0275 705/14.45 |
| 2010/0262497 A1* | 10/2010 | Karlsson | G06Q 30/02 705/14.71 |
| 2011/0166980 A1* | 7/2011 | Umblijs | G06Q 30/02 705/35 |
| 2012/0299926 A1* | 11/2012 | Hodes | H04N 21/472 345/440 |
| 2014/0089106 A1* | 3/2014 | Jordan | G06Q 30/0202 705/14.71 |
| 2017/0249652 A1* | 8/2017 | Karlsson | G06Q 30/0206 |
| 2017/0337577 A1* | 11/2017 | Karlsson | G06Q 30/0246 |

* cited by examiner

```
function tacticCV = fAdaptiveCVcurveGenerator(tractEventRateVect)        ← 602

% Configuration parameters
    controlSignalLow = 0;         ← 606
    controlSignalHigh = 1;        ← 608
604 ─ minDeltaControlSignal = 0.01;  ← 610
    maxRelDeltaVolume = 0.1,      ← 612
    minDeltaVolume = 100;         ← 614

[volumeHighCSLowerBound,volumeHighCSUpperBound] = fTractVolumeVect([],[],controlSignalHigh, tractEventRateVect,maxRelDeltaVolume,minDeltaVolume);

volumeLowCSLowerBound = zeros(length(tractEventRateVect),1);   ← 618

[volumeLowCSLowerBound,volumeLowCSUpperBound] = fTractVolumeVect(volumeLowCSLowerBound,volumeHighCSUpperBound,...   ← 620
                        controlSignalLow,tractEventRateVect,maxRelDeltaVolume,minDeltaVolume);

622 ─ tacticCV = fAdaptiveCVcurve([],controlSignalLow,volumeLowCSLowerBound,volumeLowCSUpperBound,controlSignalHigh, volumeHighCSLowerBound,...   ← 624
                        volumeHighCSUpperBound,tractEventRateVect,minDeltaControlSignal,maxRelDeltaVolume,minDeltaVolume);
    tacticCV.controlSignalSet = [tacticCV.controlSignalSet, controlSignalHigh];   ← 626
    tacticCV.volumeSetLowEst = [tacticCV.volumeSetLowEst,sum(volumeHighCSLowerBound)];   ← 628
    tacticCV.volumeSetHighEst = [tacticCV.volumeSetHighEst, sum(volumeHighCSUpperBound)];   ← 630 for i=2:length(tacticCV.controlSignalSet)   ← 634
        if tacticCV.volumeSetLowEst(i-1)>tacticCV.volumeSetLowEst(i)   ← 636
            tacticCV.volumeSetLowEst(i) = tacticCV.volumeSetLowEst(i-1);   ← 638
632 ─   end if   ← 640
        if tacticCV.volumeSetHighEst(end+1-i)> tacticCV.volumeSetHighEst(end+2-i)   ← 642
            tacticCV.volumeSetHighEst(end+1-i) = tacticCV.volumeSetHighEst(end+2-i);   ← 644
        end if   ← 646
    end for   ← 648
    return tacticCV   ← 650
```

```
function [volumeLowerBound,volumeUpperBound] =
    fTractVolumeVect(volumeLowerBoundInit,volumeUpperBoundInit,tacticControl,tractEventRateVect,maxRelDeltaVolume,minDeltaVolume}    ~702 nbrOfTracts = length(tractEventRateVect);    ~706 if isempty(volumeLowerBoundInit)    ~708
    volumeLowerBound = zeros(nbrOfTracts,1);    ~712
    for i=1:nbrOfTracts    ~714
        volumeLowerBound(i) = fTractVolume(i,tacticControl*tractEventRateVect(i));    ~716
    end for    ~718
    volumeUpperBound = volumeLowerBound;    ~720
else    ~722
    volumeLowerBound = volumeLowerBoundInit;    ~726
    volumeUpperBound = volumeUpperBoundInit;    ~728
    DeltaVect = volumeUpperBound-volumeLowerBound;    ~730
    totDeltaVolume = sum(DeltaVect);    ~732
    minTotVolume = sum(volumeLowerBound);    ~734
    [~,indexVect] = sort(DeltaVect,'descend');    ~736
    i = 0;    ~738
    while ( minTotVolume==0 && totDeltaVolume>minDeltaVolume ) || ( (totDeltaVolume/((minTotVolume+1)*tacticControl*tractEventRateVect(indexVect(i)))>maxRelDeltaVolume && totDeltaVolume>minDeltaVolume )    ~740
        i = i+1;    ~754
        tractVolume = fTractVolume(indexVect(i),tacticControl*tractEventRateVect(i));    ~756
        minTotVolume = minTotVolume-volumeLowerBound(indexVect(i))+tractVolume;    ~758
        totDeltaVolume = totDeltaVolume-DeltaVect(indexVect(i));    ~760
        DeltaVect(indexVect(i)) = 0;    ~762
        volumeLowerBound(indexVect(i)) = tractVolume;    ~764
        volumeUpperBound(indexVect(i)) = tractVolume;    ~766
    end while    ~768
end if    ~770
end    ~772
```

Fig. 7

```
function tacticCV =                                                                                             ← 802
fAdaptiveCVcurve(tacticCV,tacticControlLow,volumeLowCSLowerBound,volumeLowCSUpperBound,tacticControlHigh,volumeHighCSLowerBound,volumeHighCSUpperBound,
                 tractEventRateVect,minDeltaControlSignal,maxRelDeltaVolume,minDeltaVolume)                     ← 800

% INITIALIZATION
if isempty(tacticCV)    ← 804
         tacticCV.controlSignalSet = tacticControlLow;      ← 808
806 ─    tacticCV.volumeSetLowEst = sum(volumeLowCSLowerBound);      ← 810
         tacticCV.volumeSetHighEst = sum(volumeLowCSUpperBound);     ← 812
end if   ← 814
volumeLow = sum(volumeLowCSLowerBound);     ← 816
volumeHigh = sum(volumeHighCSUpperBound);   ← 818
deltaControlSignal = tacticControlHigh-tacticControlLow;    ← 820
deltaVolume = volumeHigh-volumeLow;   ← 822                         ← 824
if (deltaVolume/(volumeLow+1)<=maxRelDeltaVolume) || (deltaControlSignal<=minDeltaControlSignal)
         tacticCV.controlSignalSet = [tacticCV.controlSignalSet, tacticControlLow];   ← 834
832 ─    tacticCV.volumeSetLowEst = [tacticCV.volumeSetLowEst,sum(volumeLowCSLowerBound)];    ← 836
         tacticCV.volumeSetHighEst = [tacticCV.volumeSetHighEst, sum(volumeLowCSUpperBound)]; ← 838
else  ← 840                                                    ← 844
         tacticControlMid = (tacticControlLow+tacticControlHigh)/2;
         [volumeMidCSLowerBound,volumeMidCSUpperBound] = fTractVolumeVect(volumeLowCSLowerBound,volumeHighCSUpperBound,....
                 tacticControlMid,tractEventRateVect,maxRelDeltaVolume,minDeltaVolume);
         tacticCV = fAdaptiveCVcurve(tacticCV,tacticControlLow,volumeLowCSLowerBound,volumeLowCSUpperBound,....   ← 846
842 ─            tacticControlMid,volumeMidCSLowerBound,volumeMidCSUpperBound,....                               ← 848
                 tractEventRateVect,minDeltaCS,maxRelDeltaVolume,minDeltaVolume);                                ← 850
         tacticCV = fAdaptiveCVcurve(tacticCV,tacticControlMid,volumeMidCSLowerBound,volumeMidCSUpperBound,....
                 tacticControlHigh,volumeHighCSLowerBound,volumeHighCSUpperBound,....
                 tractEventRateVect,minDeltaCS,maxRelDeltaVolume,minDeltaVolume);
end if   ← 852
end      ← 854
```

SYSTEMS AND METHODS ASSOCIATED WITH ADAPTIVE REPRESENTATION OF A CONTROL/VOLUME RELATIONSHIP FOR A TACTIC GROUP

RELATED APPLICATION

This application claims priority to and is a continuation of U.S. application Ser. No. 15/231,443, filed on Aug. 8, 2016, entitled "SYSTEMS AND METHODS ASSOCIATED WITH ADAPTIVE REPRESENTATION OF A CONTROL/VOLUME RELATIONSHIP FOR A TACTIC GROUP", which is incorporated herein.

TECHNICAL FIELD

The present disclosure relates generally to computing. More specifically, and without limitation, the present disclosure relates to systems and methods for adaptive representation of a control/volume relationship for a tactic group.

BACKGROUND

Some online content providers are interested in placing content on websites (e.g., to promote products or services). In such a context, the placing of the content can also be referred to as an "impression" of the content. In general, these online content providers pay based on events, for example, impressions, clicks, views, or conversions over the course of a content campaign in an effort to achieve a desired revenue for the content campaign. In a campaign, revenue generally refers to the amount of money actually spent or the number of events delivered.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

BRIEF DESCRIPTION OF THE DRAWINGS

FIG. 6 depicts illustrative pseudo code that can be utilized for producing a vector representation of a control/volume (C/V) curve, in accordance with various embodiments of the present disclosure.

FIG. 7 depicts example pseudo code for an illustrative function that can be utilized in producing a representation of a C/V curve, in accordance with various embodiments of the present disclosure.

FIG. 8 depicts example pseudo code for an another illustrative function that can be utilized in producing a representation of a C/V curve, in accordance with various embodiments of the present disclosure.

DETAILED DESCRIPTION OF THE EMBODIMENTS

Figure 1:
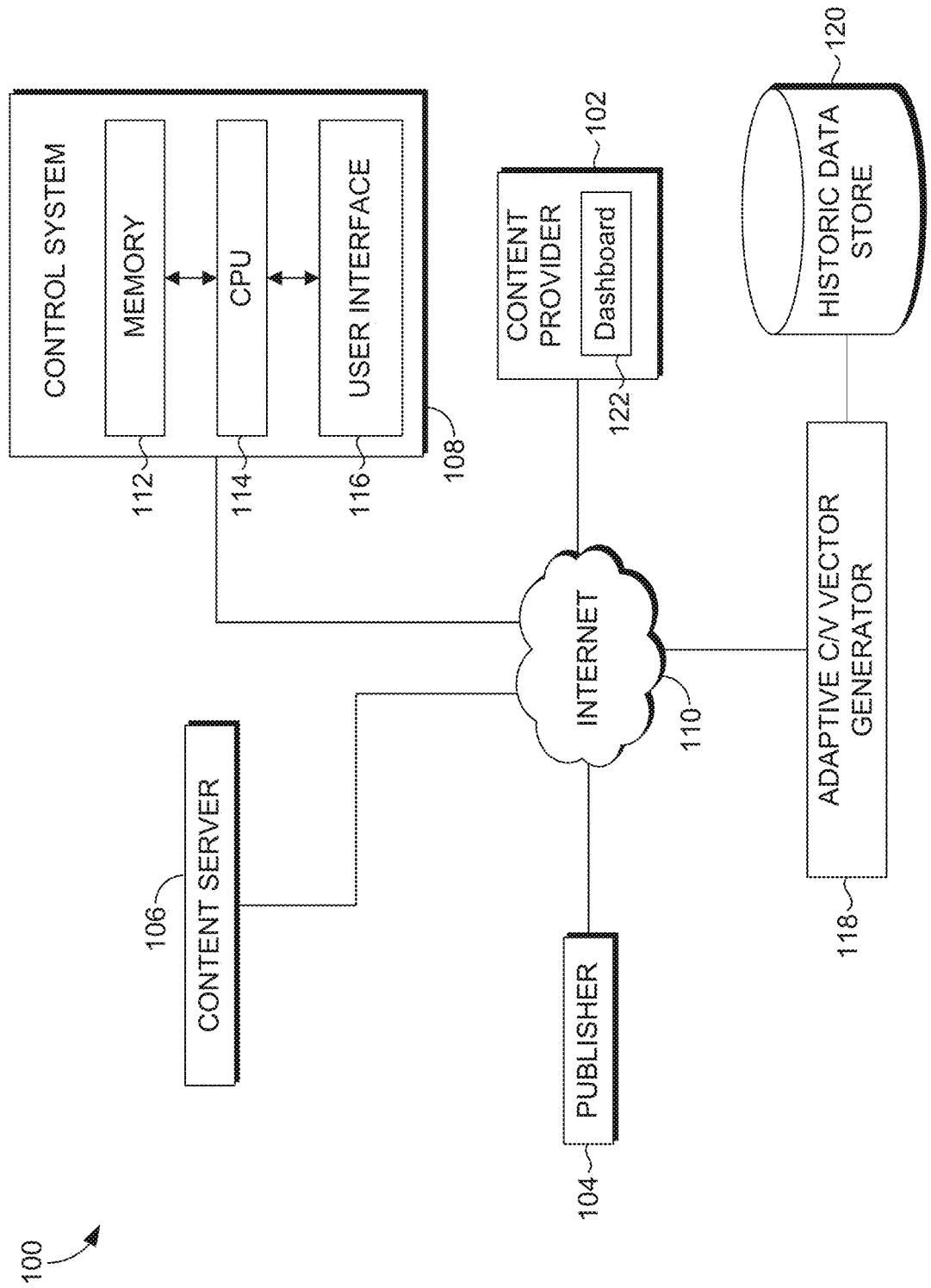
FIG. 1 depicts an illustrative content delivery system, in accordance with embodiments of the present disclosure.

A relationship between a control signal and an estimated volume of an event that would occur at that control signal can take the form of a control/volume (C/V) curve that correlates values for the control signal with corresponding estimated resulting volume at each control signal value. One mechanism for providing such a C/V curve is to equally divide the range of control signal values into increments (e.g., into 0.001 control value increments) and to determine an estimated volume corresponding with each increment. Such a mechanism, however, does not take into account that certain control signal segments within the control signal range yield higher magnitude volume changes than other control signal segments within the price range, which may yield little to no change in magnitude with respect to volume. As a result, a great deal of processing time can be wasted calculating estimated volume for control signal increments without regard to the change in volume that the control signal increment yields. In addition, such a mechanism can provide a large quantity of data. For example, if the control signal values range from 0 to 1, then the resulting data, at 0.001 increments, would include a total of 1,000 points of data.

The above mentioned inefficiencies are magnified when considering a tactic group, or campaign, that can include any number of tracts, or segments. As used herein, a tract refers generally to a portion of a target audience for the tactic group, additional details concerning tracts will become apparent from this disclosure. In such a tactic group, the volume of an event at a selected control signal value is a sum of the volume of that event for each tract at the selected control signal value. As such, the above mechanism would need to be carried out for each tract within the tactic group and the resulting volume from each tract would need to be summed to determine the resulting volume for the tactic group as a whole. This introduces another inefficiency, because an increment of a control signal may yield a larger change in volume in one tract than in another. Under the above discussed scenario, which yielded 1,000 points of data, a tactic group with 4 tracts, would yield a total of 4,000 points of data. It will be appreciated that this is merely an illustrative number of tracts and that the actual number of tracts can extend into the thousands or more. Because of these considerations, the above discussed mechanism does not scale well as more and more requests for C/V information are received and processed, especially where those requests are associated with tactic groups having multiple tracts, or segments.

In embodiments of the present disclosure, methods and systems associated with representations of C/V curves for a given tactic group are described. Such representations can include control segments selected based, at least in part, on a difference in magnitude in estimated volume that is represented by the control segment (i.e., occurs across the control segment). Furthermore, control signals that fall within the control segments need not be analyzed, saving a great deal of computational resources. In addition a great deal of bandwidth savings can also be realized by only transmitting the data for those control segments that are included within the vector representation of the C/V curve.

Reference will now be made in detail to illustrative embodiments of the invention, examples of which are illustrated in the accompanying drawings. Wherever possible, the same reference numbers will be used throughout the drawings to refer to the same or like parts.

FIG. 1 depicts an illustrative content delivery system 100, in accordance with embodiments of the present disclosure. As shown in FIG. 1, content delivery system 100 may include one or more content providers 102, publishers 104, content servers 106, control systems 108, adaptive control/volume (C/V) vector generators 118 that are in communication with one another through a network, such as the Internet 110. The number and orientation of the computing components in FIG. 1 is provided for purposes of illustration only. Any other number and orientation of components is possible. For example, one or more content providers 102, publishers 104, content servers 106, control systems 108, adaptive C/V vector generators 118, and historic data stores 120 may be combined or co-located and/or communicate directly with one another, instead of over Internet 110. The components of FIG. 1 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Content providers 102 represent computing components associated with entities having online content that the entities desire to deliver to online users. In some embodiments, the content with which the content providers 102 are associated includes targeted content. Targeted content can include, for example, marketing content (e.g., banner content, pop-up content, etc.). Content providers 102 may interact with publishers 104, content servers 106, control systems 108, and/or adaptive C/V vector generator 118 through the Internet 110. Thus, content provider 102 may be able to communicate content delivery information, such as content information, targeting information, user information, budget information, bidding information, etc., to other entities in content delivery system 100. Dashboard 122 can be configured to present information concerning content delivery system 100 and, in particular, existing or potential content delivery campaigns, also referred to herein as tactic groups, and associated tracts that define a target audience for the tactic group. This information can include, for example, C/V information discussed herein. In embodiments, this C/V information can include a vector representation of a C/V curve for a target audience of a tactic group to aid a user of dashboard 122 in determining aspects of online content delivery to the target audience. Such a vector representation of a C/V curve can be generated, for example, by adaptive C/V vector generator 118 based on previously observed volume information that is correlated with previously observed price information contained in historic data store 120 for each tract in the tactic group.

Publishers 104 represent computing components associated with entities having inventories of available online content space. For example, publishers 104 may include computing components associated with online media providers, search engines, e-mail programs, web-based applications, or any computing component or program having online user traffic. Publishers 104 may interact with content providers 102, content servers 106, and/or controllers 108 via the Internet 110. Thus, publishers 104 may be able to communicate inventory information, such as site information, demographic information, cost information, etc., to other computing components in system 100.

Content servers 106 may include servers or clusters of servers configured to process content delivery information from content provider 102 and/or inventory information from publishers 104, either directly or indirectly. In certain embodiments, content servers 106 may be remote web servers that receive content information from content provider 102 and serve content to be placed by publishers 104 on websites maintained, controlled, or owned by publishers 104. Content servers 106 may be configured to serve content across various domains of publishers 104, for example, based on content delivery information provided by content providers 102. Content servers 106 may also be configured to serve content based on contextual targeting of web sites, search results, and/or user profile information, all of which can be utilized in determining one or more tracts defining the target audience for the content. In some embodiments, content servers 106 may be configured to serve content based on one or more signals generated by control systems 108.

Historic data store 120 can include historic information concerning each impression that is delivered within content delivery system 100, including: a price at which each impression was delivered, such a price would correspond with the clearing price of each impression; additional events that the impression lead to (e.g., click-through, conversion, viewed, etc.); and audience information for the impression (e.g., website, location information, demographic information, etc.).

Adaptive C/V vector generator 118 can utilize the historic information discussed above to generate a vector representation of a C/V curve of a target event for an audience targeted by the tactic group. Such a vector representation can include a sequence of control signal values each control signal value correlated with a low volume estimate and a high volume estimate for the target event at the respective control signal. As used herein, volume refers to a count of the target event. Such a control signal can be utilized in determining a price at which a certain amount of inventory (e.g., impressions) is awarded. In embodiments, the control signal values included within the sequence of control signal values can be determined such that control signal values included within the vector representation are determined based, at least in part, on a difference between the low volume estimate and the high volume estimate for each control signal value. This can be accomplished, in at least one embodiment, by calculating a price for each tract of the tactic group, at a selected control signal value, based on event rate estimates for each of the tracts. It will be appreciated that this is merely meant to be illustrative of a mechanism that can be utilized to calculate a price for a selected control signal value and that other mechanisms can be utilized without departing from the scope of this disclosure, Because the price is based on the event rate for each tract, which can vary from tract to tract, the resulting price for each tract can also vary from tract to tract, even at the same control signal value. The price for a respective tract at the selected control signal value can then be utilized to determine an estimated volume of inventory (e.g., impressions) that could be awarded for the respective tract at, or below, the calculated price. The volume of content delivery instances for each tract could then be summed to yield an estimated volume for the tactic group as a whole at the selected control signal value. This process is described in greater detail below.

Control system 108 may include computing systems configured to receive information from computing components in system 100, process the information, and generate various outputs (e.g., the control signal discussed herein) to be sent to other computing components in system 100, according to the illustrative methods described herein. As discussed in greater detail below, operations performed by campaign control system 108 can, for example, be initialized, re-initialized, or guided utilizing a representation of a C/V curve (e.g., that produced by adaptive C/V vector generator 118). Control systems 108 may include any type or combination of computing systems, such as clustered computing machines and/or servers, including virtual computing machines and/or virtual servers. Control systems 108 may include, for example, implementations of Adlearn Open Platforms (AOP) control systems offered by America Online (AOL) of New York, N.Y. In some embodiments, control systems 108 may include an assembly of hardware, including a memory 112, a central processing unit ("CPU") 114, and/or a user interface 116. Memory 112 may include any type of RAM or ROM embodied in a physical, computer-readable storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory, for example to perform the methods and processes discussed in detail herein. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, graphical user interface, touchscreen or pad, keyboard, and/or mouse. In other embodiments, campaign control systems 108 may include virtual representations of hardware operating, for example, on a virtualization server.

Figure 2:
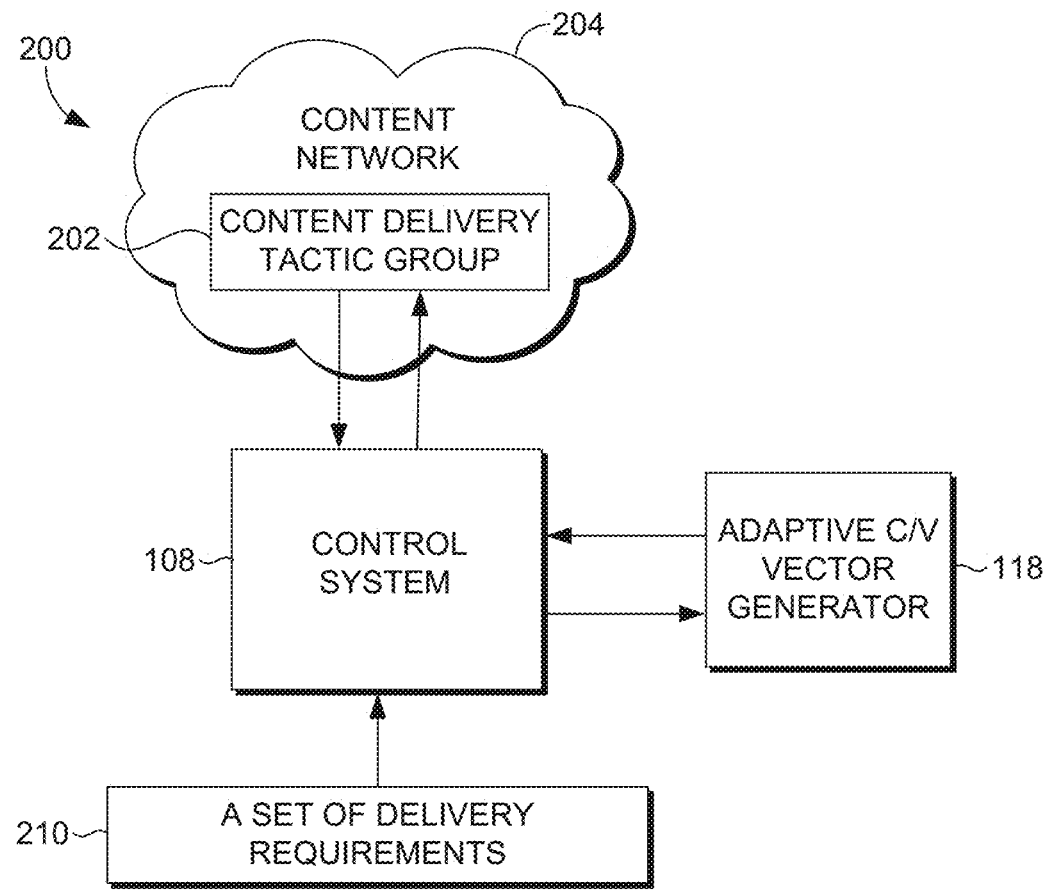
FIG. 2 depicts an illustrative online control system for controlling an online content delivery campaign operating in an online content network, in accordance with various embodiments of the present disclosure.

FIG. 2 depicts an illustrative online content delivery environment 200 for controlling an online content delivery tactic group 202 operating in an online content network 204. Content network 204 may include a network or collection of one or more content providers 102, one or more publishers 104, content servers 106, control systems 108, adaptive C/V vector generator 118, or other components of system 100. Elements of content network 204 may operate to receive requests for content (e.g., impression requests) associated with one or more content space inventories, or tracts, e.g., from publishers 104 such as websites or other computing components with an inventory of available content space. Content network 204 may also group content requests for various content delivery tactic groups, e.g., according to impressions to be "targeted" based on a combination of attributes defined by the content requests. Content network 204 may also accept bids (e.g., from one or more control systems 108) on the content requests and process the bids to serve content (e.g., targeted content) to the content requests.

Any number or type of content delivery tactic groups 202 may be operated within content network 204, across various content servers and domains associated with the Internet. Online content delivery environment 200 may be implemented by one or more of the content providers 102, publishers 104, content servers 106, and/or control systems 108 described in FIG. 1. For example, online content delivery environment 200 may represent the interaction of one or more control systems 108 with other computing components in system 100.

In one embodiment, online content delivery environment 200 may include one or more instances of control system 108. Control system 108 may comprise computers or servers connected to the Internet. Such computers or servers may be configured as described with respect to control system 108, as depicted by FIG. 1, or in any other suitable configuration. Alternatively, control system 108 may be implemented by software modules executed by CPUs 114 of control system 108. Control system 108 may be embodied entirely in hardware, entirely in software, or in any combination of hardware and software implemented across any number of computing devices.

Control system 108 may be provided with a set of delivery requirements 210, which may be adjustable design parameters set by a user. For instance, the set of delivery requirements may include cost requirements (e.g., the maximum cost discussed in reference to FIG. 3), pacing requirements (e.g., daily budget goals, daily content delivery goals), targeting requirements (e.g., based on a demographic analysis) for a target audience, and/or spread requirements (e.g. to control content delivery across inventory tracts/units/cells/segments, and/or user targets, etc.). The set of delivery requirements 210 may be implemented by control system 108.

In addition to the set of delivery requirements, control system 108 can also be provided with C/V information. This C/V information can be provided in the form of a vector representation of a C/V curve generated by adaptive C/V vector generator 118. This vector representation of a C/V curve can be provided in response to a request submitted by control system 108 to adaptive C/V vector generator 118. Such a request can identify a target event and one or more tracts that define a target audience to utilize in generating the vector representation of the C/V curve. Adaptive C/V vector generator 118 can utilize historic information, such as that discussed above, to generate a vector representation of a C/V curve of the target event for the identified tracts. As mentioned previously, such a vector representation can include a sequence of control signal values each control signal value correlated with a low volume estimate and a high volume estimate for the target event at the respective control signal value. In embodiments, the control signal values included within the sequence of control signals can be determined such that control signal values included within the vector representation are determined based, at least in part, on a difference between the low volume estimate and the high volume estimate for each control signal value. The generation of such a vector representation is discussed in greater detail below.

Figure 3:
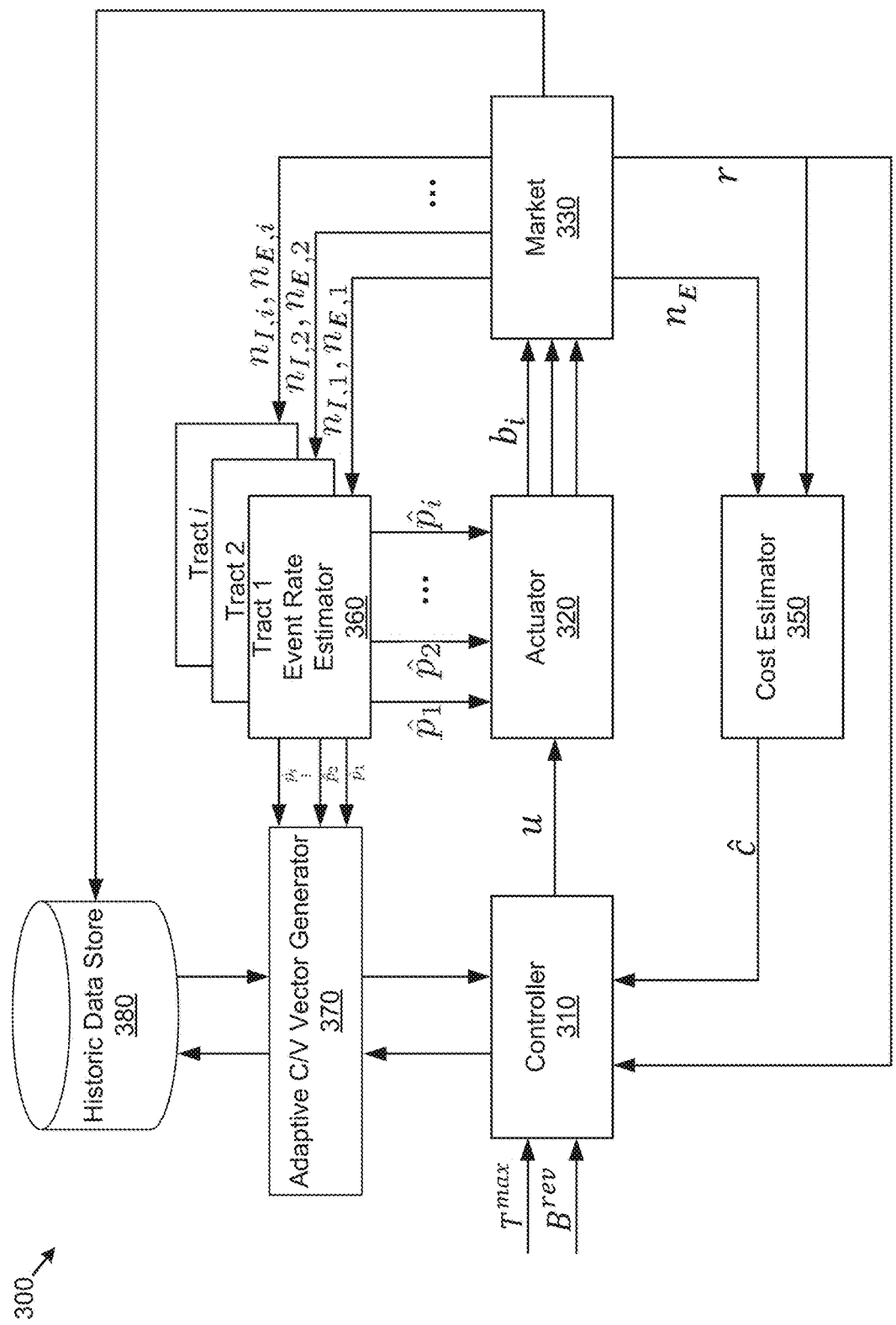
FIG. 3 depicts an illustrative control system, in accordance with various embodiments of the present disclosure.

FIG. 3 depicts a block diagram of a portion of an illustrative control system 300, for controlling online content delivery tactic groups, communicatively coupled with an adaptive C/V vector generator 370, in accordance with various embodiments of the present disclosure. Control system 300 may generally be configured to utilize data previously observed in market 330. This data can be utilized to control subsequent bids placed in market 330 to facilitate, for example, obtaining the desired pacing, and/or delivery, at or below a cost limit set by the content provider. As depicted, system 300 includes a controller 310 (e.g., control system 108 of FIG. 2), an actuator 320, a market 330, a cost estimator 350, and a plurality of tract performance rate estimators 360, an adaptive C/V vector generator 370, and a historic data store 380. Each of these components may be communicatively coupled with one another, for example, as depicted in FIG. 3. This communicative coupling may be, for example, via a bus, network, shared memory, etc., or any combination thereof.

Cost estimator 350 is configured to take as input an observed event volume, $n_E$; and observed revenue, or pacing, r. The observed event volume and the observed revenue can be determined from actual event volume and revenue observed in market 330. The observed event volume and/or the observed revenue may be a moving average calculated over a period of time. This period of time can be any duration of time that may be selected based upon certain tactic group characteristics. For example, a shorter period of time can enable quicker reflection of changes in market 330, however the results could be noisier than those of a moving average calculated over a longer period of time. A moving average calculated over a longer period of time, on the other hand, can be less noisy than a moving average calculated over a shorter period of time, but is slow to react to changes in market 330. As a result, the time period for such a moving average may be dependent on the tactic group and/or volatility of market 330. The above discussed moving average may be calculated by a moving average filter that could be located in-line between market 330 and cost estimator 350. Discrete observed event volume and observed revenue in market 330 may be monitored, for example, via an event volume sensor and a revenue sensor configured to obtain real-time data about the tactic group to which control system 300 is assigned. Cost estimator 350 may produce an estimated cost, ĉ, based, at least in part on, the observed event volume, $n_E$, and the observed revenue, r.

Controller 310 is configured to take as input a max cost reference signal, $T^{max}$, hereinafter merely referred to as max cost. Max cost may be a user (e.g., content provider) defined maximum cost that the user is willing to pay for an event. As used herein, event, or target event, refers to any action taken with an instance of content (e.g., impression, click, or conversion). In embodiments, max cost may represent the maximum average cost the user is willing to pay for each event, the maximum discrete cost the user is willing to pay for each event, or any other suitable cost restriction.

Controller 310 is also configured to take as input a desired pacing reference signal, $B^{rev}$. Desired pacing may be user defined and may also be referred to as a maximum desired revenue or a maximum budget. As used herein, revenue may refer to actual dollars spent or actual events delivered. As such, desired pacing may be expressed as monetary units (e.g., dollars spent) or as a number of events. For example, if a content delivery tactic group has a daily budget of $900 and has spent $800 in a given day, observed pacing for the tactic group on that given day is $800. Controller 310 is also configured to take as input the observed pacing, r, and the cost estimate, ĉ, which was produced by cost estimator 350.

Controller 310 is configured to determine a control signal, u. Once control system 300 has been operating for a period of time, the control signal, u, more specifically referred to as a price control signal, can be calculated by controller 310 based, at least in part, on the max cost and the desired pacing, in addition to observed pacing, r, and the estimated cost, ĉ. However, during the time period when controller 310 first begins operating, there is no observed pacing, r, from market 330 to utilize in determining the control signal, u. In addition, as mentioned above, cost estimator 350 also utilizes observed pacing, r, to determine the estimated cost, ĉ. As mentioned previously, observed pacing can be based on events delivered. As such, accurate estimation of anticipated events delivered can be important to achieving the goals of the tactic group to which controller 310 is assigned. As a result of these considerations, controller 310 may need to rely on historic data from market 330 to initially determine a control signal that is calculated to facilitate obtaining the desired pacing within the limits of max cost and/or inventory available in market 330.

As used herein, historic data, with respect to a tactic group, refers to data collected prior to the implementation, or operation, of the tactic group, or campaign. This is as opposed to observed data, which refers to data that is observed while the tactic group is operating. This historic data can be acquired by controller 310 submitting a request (e.g. to adaptive C/V vector generator 370 discussed below) to acquire the historic data. Such historic data can be stored in historic data store 380. In embodiments, historic data store 380 can include data collected across any number of content delivery tactic groups. This data can include, for example, information on each impression that was delivered within market 330, including a price of each impression (e.g., clearing price), additional events that the impression lead to (e.g., click-through, conversion, viewed, etc.), and tract information for the impression (e.g., website, location information, demographic information, etc.).

In embodiments, the above discussed historic data can be utilized to generate a C/V curve that correlates control signal values, such as those produced by controller 310, with a corresponding estimated resulting volume for the tactic group at each control signal value. The estimated volume could be based on a sum of estimated volume for each tract within the tactic group at prices for each tactic group that are determined based on each respective control signal value. One mechanism for providing such a C/V curve is to equally divide the range of control signals into increments (e.g., into 0.001 increments) and to determine an estimated volume corresponding with each control signal increment. Such a mechanism, however, does not take into account that certain control signal segments within the control signal range yield higher magnitude volume changes than other control signal segments within the price range, which may yield little to no change in magnitude with respect to spend. In addition, such a mechanism does not take into account that an increment in control signal can result in a higher magnitude volume change from one tract to another. As such, not only does such a mechanism have to process an estimated volume for each control signal increment, in tactic groups with multiple tracts, each tract must be processed at each control signal increment to determine a volume for the respective tract. As a result, a great deal of processing time can be wasted calculating estimated volume for control signal increments without regard to the change in volume that the price increment yields with each tract. In addition, such a mechanism can provide a large quantity of data. For example, if the control signal values range from 0.0 to 1.0, then the resulting data, at 0.001 increments, would include a total of 1,000 points of data for each tract. As such, in addition to the processing considerations above, a great deal of bandwidth can be taken up in transmitting this quantity of data. Because of these considerations, the above mechanism does not scale well as more and more requests for C/V information are received and processed.

In embodiments of the present disclosure, adaptive C/V vector generator 370 is configured to generate a vector representation of a C/V curve such that control signal segments that are included within the vector representation are selected based, at least in part, on a difference in magnitude in estimated volume for the tactic group that occurs across the control signal segment. Furthermore, control signal values that fall within the control signal segments need not be analyzed, saving a great deal of computational resources. In addition a great deal of bandwidth savings can also be realized by only transmitting those control signal segments that are included within the vector representation of the C/V curve. This can be accomplished, in at least one embodiment, by calculating a price for each tract of the tactic group, at a selected control signal value, based on event rate estimates for each of the tracts (e.g., those event rate estimates produced by event rate estimators 360). It will be appreciated that this is merely meant to be illustrative of a mechanism that can be utilized to calculate a price for a selected control signal value and that other mechanisms can be utilized without departing from the scope of this disclosure, It will also be appreciate that the mechanism selected for generating the mapping of control signal to price for a tract of a tactic group will be the same as that utilized by actuator 320, discussed below. Because the above discussed control signal to price mapping is based on the event rate for each tract, which can vary from tract to tract, the resulting price for each tract would also necessarily vary from tract to tract, even at the same control signal value. The price for a respective tract at the selected control signal value can then be utilized to determine an estimated volume of inventory (e.g., impressions) that could be awarded for the respective tract at, or below, the calculated price for that tract. The volume of inventory awarded for each tract could then be summed to yield an estimated volume for the tactic group as a whole at the selected control signal value. Example methods for generating such a vector representation are discussed below in reference to FIGS. 4-8 and 9A-9D.

As mentioned above, controller 310 is configured to determine a control signal, u, based on the above described input data. Such a control signal can be determined by any suitable function. In embodiments, such a function may be configured to attempt to facilitate obtaining the desired pacing within the limits of max cost and/or inventory available in market 330. Such functions are known in the art and will not be discussed further herein. In some embodiments, an allocation control signal, $u_a$, (not depicted) can also be calculated by controller 310. Such an allocation control signal represents the percentage or ratio (e.g., point value from 0 to 1) of inventory the tactic group is willing to purchase at the bid price discussed below.

In some embodiments, controller 310 is configured to periodically update the control signal, u. These periodic updates may take place at predefined time intervals (e.g., every 15 minutes), based on a specific occurrence (e.g., based on a magnitude of change to observed pacing), or any other suitable period. In other embodiments, tactic group controller 310 may update the control signal, u, in real time as the above discussed inputs to controller 310 change.

Tract performance rate estimators 360 are configured to take as input an observed impression volume for a tract, $n_{1,i}$, and an observed event volume for the tract, $n_{E,i}$. The 'i' refers to the tract in which the observed impression volume and the observed event volume were observed. As used herein a tract refers to a defined portion of market 330. A tactic group may include any number of tracts from which inventory is desired. Such tracts may include, for example, a website, a group of individuals identified by demographic analysis (e.g., males between the age of 25 and 35 in California), a distinct individual, etc. A tract may also be referred to in the art, and herein, as a cell, segment, or unit. The observed impression volume, $n_{1,i}$, and the observed event volume, $n_{E,i}$, for each segment can be determined from actual observations in market 330 pertaining to the respective segment. Discrete observed impression volumes for the segments and discrete observed event volumes for the segments may be monitored in market 330, for example, via a tract impression sensors (not depicted) and tract event sensors (not depicted), respectively, configured to obtain real-time data about the tract to which these components are assigned. Tract event rate estimator 360 can output a performance prediction, $\hat{p}_i$, for each tract ('i').

Actuator 320 takes the control signal, u, as input. In addition, actuator 320 can take the one or more tract performance predictions, $\hat{p}_i$, as input. Again, the 'i' refers to the tract to which the tract performance prediction belongs. Actuator 320 may utilize the combination of the control signal, u, and the tract performance predictions, $\hat{p}_i$, to calculate a bid price, $b_i$. In some embodiments, the bid price, $b_i$, is calculated, for example, by taking the product of u and $\hat{p}_i$, for each i. It will be appreciated that this is merely meant to be illustrative of a mechanism that can be utilized to calculate a price for a selected control signal value and that other mechanisms can be utilized without departing from the scope of this disclosure, It will also be appreciate that the mechanism selected for generating the mapping of control signal to price for a tract of a tactic group will be the same as that utilized by adaptive C/V vector generator 370, discussed below. These bids are depicted by the individual arrows flowing from actuator 320 to market 330. In other embodiments, the bid price may be a capped tract bid price calculated, for example, using the equation $b_i=\min(\text{maxCPI}, u_p\hat{p}_i)$, where maxCPI is max cost per impression, or, as another example, equation $b_i=\min(\text{maxCPI}_i, u_p\hat{p}_i)$, where $\text{maxCPI}_i$ is max cost per impression for tract i. It will be appreciated by someone of ordinary skill in the art that these examples are merely meant to be illustrative and are not intended to limit the scope of this disclosure. For example, min can be replaced by max and/or the min (max) operation may be conditional based on user, content, or impression specific information. In addition, the capping may apply only for a certain type of user, a certain time of the day, in a certain geographic region, etc.

Market 330 represents a bidding environment in which content providers place requests for content space that is offered by publishers. The above discussed components facilitate a content provider in obtaining the desired pacing within the limits of max cost $T^{max}$ and/or inventory available in market 330.

Figure 4:
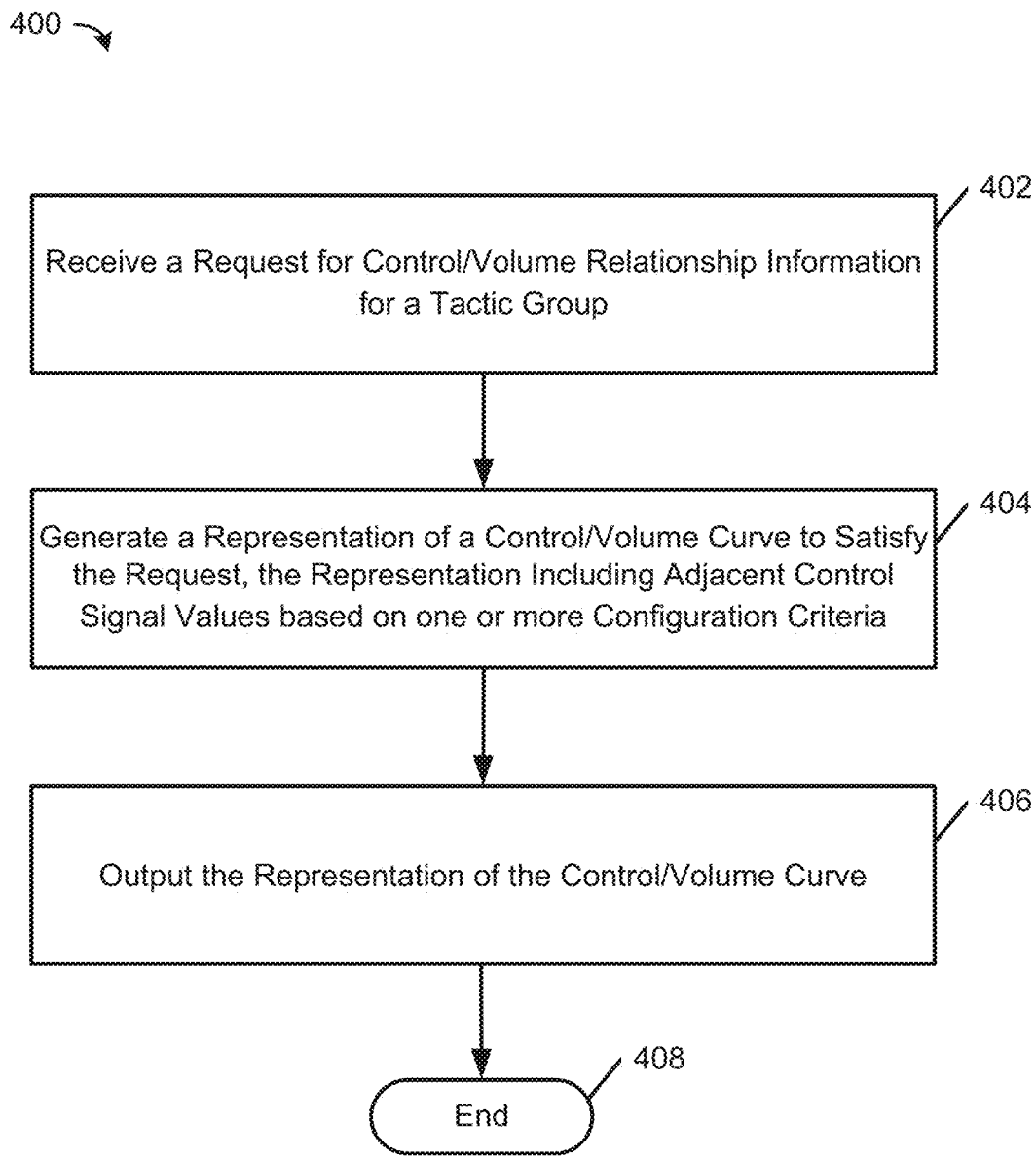
FIG. 4 depicts an illustrative process flow for processing a request for a vector representation of a C/V curve, in accordance with various embodiments of the present disclosure.

FIG. 4 depicts an illustrative process flow 400 for processing a request for a vector representation of a C/V curve, in accordance with various embodiments of the present disclosure. Process 400 may be performed by processing logic that comprises hardware (e.g., circuitry, dedicated logic, programmable logic, microcode, etc.), software (e.g., instructions run on a processing device to perform hardware simulation), or any combination thereof. As such, process 400 may be performed by a computing device, e.g., computing device 1100 of FIG. 11, to implement one or more embodiments of the present disclosure. It will be appreciated that process 400 can have fewer or additional operations, or perform some of the operations in different orders without departing from the scope of this disclosure.

In various embodiments, the process begins at block 402, where a request for C/V relationship information is received for a content delivery tactic group. This request can be received, for example, from a tactic group control system (such as those discussed herein) or from a dashboard (e.g., dashboard 122 of FIG. 1). Such a request can include an identifier for a target event (e.g., impression, view, click, conversion, etc.) and tracts that define a target audience (e.g., target demographic information, target websites, frequency cap information defining a maximum frequency for which a specific user is to be served targeted content within a specified time interval, etc.).

At block 404, a representation of a C/V curve of the target event for the target audience can be generated. The representation of the C/V curve can include a number of control signal segments where each control signal segment included within the representation is based, at least in part, on one or more configuration criteria, such as that discussed elsewhere herein. In some embodiments, the representation of the C/V curve can be generated recursively (as discussed in reference to FIG. 8, below, or iteratively as discussed in reference to FIG. 5, below).

At block 406, the representation of the C/V curve can be output to the requestor. As mentioned above, such a requestor can include a tactic group control system. The representation of the C/V curve can enable the tactic group control system to calculate an initial bid, utilizing the representation of the C/V curve, to achieve a desired pacing. In addition, such a requestor can include a dashboard being utilized by a marketer. The representation of the C/V curve can aid a user of the dashboard in determining aspects of an online marketing tactic group that includes the target audience. For example, if the user is wishing to target an tract including only males in California at a selected max cost, the representation of the C/V curve can help the user determine if a desired pacing can be achieved within the constraints of the selected max cost. If the representation of the C/V curve indicates that the desired pacing cannot be achieved for the target audience within the max cost constraints, then the user can decide to adjust the target audience (e.g., include Arizona as well as California), adjust a max cost constraint (e.g., increase the max cost if the inventory is not exhausted to try to gain additional inventory), or reduce the desired pacing.

It will also be appreciated that such a representation of a C/V curve can also be utilized to troubleshoot a tactic group that is not performing as intended. In such an embodiment, an operator of the tactic group control system can request a representation of a C/V curve to be utilized to determine if the performance is related to a abnormalities in the expected C/V relationship.

Figure 5:
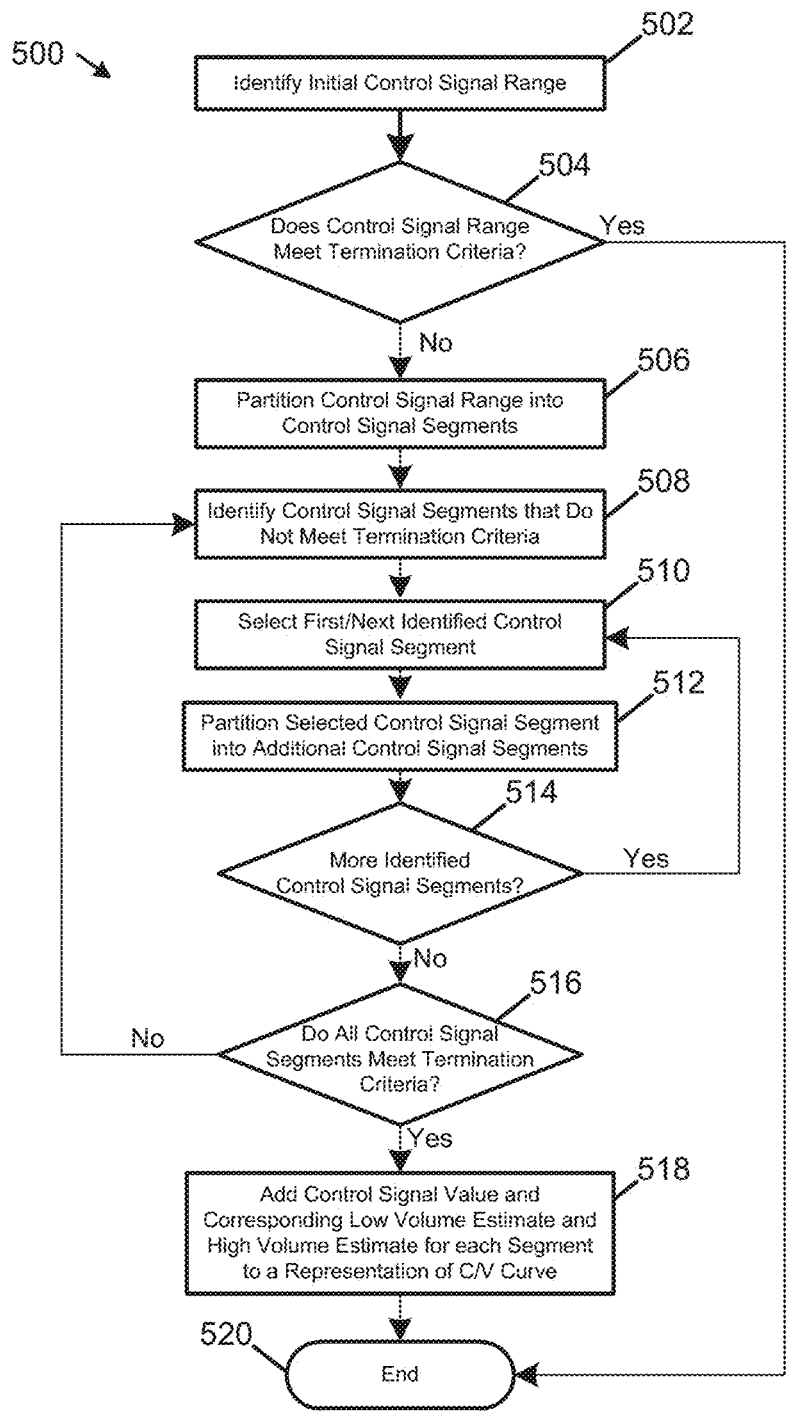
FIG. 5 depicts an illustrative process flow for generating an adaptive representation of a C/V curve, in accordance with various embodiments of the present disclosure.

FIG. 5 depicts an illustrative process flow 500 for generating an adaptive representation of a C/V curve, in accordance with various embodiments of the present disclosure. Process 500 may be performed, for example, by adaptive C/V vector generator 118 of FIGS. 1 & 2 or adaptive C/V vector generator 370 of FIG. 3. In various embodiments, process 500 may be performed in reference to block 404 of FIG. 4.

Process flow 500 may begin at block 502, where an initial control signal range for the representation of the C/V curve is determined. This may be accomplished through input by a user defining a specific range, utilizing a default range, or dynamically searching historic data to identify an appropriate range. It will be appreciated that, in some embodiments, the control signal range may be selected such that the price resulting from the lowest control signal value of the control signal range is below any awarded event volume for all tracts of the tactic group and the price resulting from the highest control signal value of the control signal range is above any awarded event volume for the target audience. It will be appreciated that the control signal to price mapping can be accomplished as described above in reference to actuator 360 and adaptive C/V vector generator 370.

At block 504, a determination is made as to whether the control signal range meets termination criteria. Such termination criteria can correspond, for example, to any of the configuration parameters discussed in reference to FIGS. 6-8, especially those discussed in reference to line 822 of FIG. 8. As such, the termination criteria can include a minimum difference in control signal values across a control signal segment within the representation of the C/V curve (e.g., minDeltaControlSignal), a maximum percentage difference for event volume across a control signal segment within the representation of the C/V curve (e.g., maxRelDeltaVolume), and/or a minimum difference in event volume across a control signal segment within the representation of the C/V curve (e.g., minDeltaVolume). The maxRelDeltaVolume parameter can be considered a volume uncertainty threshold. It will be appreciated that additional, or alternative, termination criteria could also be included without departing from the scope of this disclosure.

As discussed previously, in some embodiments, the volume of a tactic group for a selected control signal value can be determined by calculating a price for each tract of the tactic group based on a product of the selected control signal value and an event rate estimate for each of the tracts in the tactic group. It will be appreciated that this is merely meant to be illustrative of a mechanism that can be utilized to calculate a price for a selected control signal value and that other mechanisms can be utilized without departing from the scope of this disclosure, It will also be appreciate that the mechanism selected for generating the mapping of control signal to price for a tract of a tactic group will be the same as that utilized by an actuator of the control system (e.g., actuator 320 of FIG. 3). Because the above discussed control signal to price mapping is based on the event rate for each tract, which can vary from tract to tract, the resulting price for each tract would also necessarily vary from tract to tract, even at the same control signal value. The price for a respective tract at the selected control signal value can then be utilized to determine an estimated volume of inventory (e.g., impressions) that could be awarded for the respective tract at, or below, the calculated price for that tract. The volume of inventory awarded for each tract could then be summed to yield an estimated volume for the tactic group as a whole at the selected control signal value.

If the control signal range meets the termination criteria, then the processing proceeds to block 520 where the processing ends. If on the other hand, the control signal range does not meet the termination criteria, then the processing proceeds to block 506 where the control signal range is partitioned into control signal segments. In some embodiments, the control signal range is partitioned based on a mid-point of the control signal range, such that the control signal range is divided into two substantially equal control signal segments. In other embodiments, the price range may be divided in another manner (e.g., asymmetric binary partition, multiple partition points, etc.).

At block 508 control signal segments that do not meet the termination criteria mentioned above are identified. At block 510 a first, or next, identified control signal segment is selected. At block 512, the selected control signal segment is further partitioned into additional control signal segments. Such partitioning could be accomplished in a similar manner to that described above in reference to block 506, or that described elsewhere herein.

At block 514, a determination is made as to whether there are any more identified control signal segments. If there are more identified control signal segments, then the processing proceeds back to block 510, where the next identified control signal segment is selected and the operations of blocks 510 and 512 are repeated. If there are no more identified control signal segments, then processing proceeds to block 516 where a determination is made as to whether all control signal segments that resulted from the processing described above meet the termination criteria. If any control signal segments do not meet the termination criteria, then the processing returns to block 508 where the above described processes are repeated.

If all control signal segments meet the termination criteria, then processing proceeds to block 518 where a control signal value representing each control signal segment and associated low volume estimate and high volume estimate for each control signal segment are added to a representation of a C/V curve. Such a representation may be, for example, a vector. As used in this context, a vector can take any form that is suitable for correlating each control signal value with corresponding low volume estimate and high volume estimate. As such, the vector could be a three dimensional array where one dimension represents control signal values, a second dimension represents the low volume estimate, and the third dimension represents the high volume estimate. In other embodiments, the vector could be three one dimensional arrays having a corresponding number of members. In these embodiments, one array would represent the control signal, the second array would represent the low volume estimate, and the third array would represent the high volume estimate. In such a scenario the control signal can be correlated to the corresponding volume estimates based on the respective locations within each array. It will be appreciated that, in other embodiments, the control signal value and corresponding volume estimates for each segment, or partition, could also be added after each of the above partitioning operations (e.g., after 506 and 512). In such an embodiment, there is a possibility that an ordering operation would be needed to get the control signal values in ascending order to accurately represent the C/V curve. Once block 518 is complete, the processing can proceed to block 520 where the processing can end.

FIG. 6 depicts illustrative pseudo code for main function 600 that can be utilized for producing a vector representation of a C/V curve for a tactic group, in accordance with various embodiments of the present disclosure. The main function 600 is defined at line 602 where it can be seen that a handle for the main function is defined as "fAdaptiveCVcurveGenerator," and that at line 650, this function returns a vector that represents a C/V curve defined as tacticCV that is determined within the function. As can be seen, function 600 takes as input a vector (tractEventRateVect) having a member for tract of a tactic group that defines an event rate for a target event of the respective tract.

Code section 604 defines configuration parameters for determining the vector representation of the C/V curve of a given tactic group. It will be appreciated that the values for these configuration parameters are merely meant to be illustrative of possible values. The values of these configuration parameters can vary depending on any number of considerations. As a result, the depicted values should not be taken as limiting of this disclosure. The first configuration parameter, "controlSignalLow," depicted in line 606, represents a minimum control signal value (e.g., $u_p$ of FIG. 3) desired for the vector representation of the C/V curve. The second configuration parameter, "controlSignalHigh," depicted in line 608, represents a maximum control signal value desired for the vector representation of the C/V curve. In a specific embodiment, controlSignalLow and controlSignalHigh can be selected to attempt to ensure a full range of the representation of the C/V curve. For example, controlSignalLow can be selected to achieve a low price that is equal to, or below, a price at which no spend occurs (i.e., no inventory would be awarded at the low price), and controlSignalHigh can be selected to achieve a high price that is equal to, or above, a highest anticipated price above which no additional spend occurs (i.e., the inventory is exhausted at, or above, the high price).

The third configuration parameter, "minDeltaControlSignal," depicted in line 610, represents a minimum desired change in control signal to be represented within the control signal segments of the vector representation of the C/V curve. The fourth configuration parameter, "maxRelDeltaVolume," depicted in line 612, represents a maximum relative difference in volume that is desired within a price segment of the vector representation of the C/V curve. As depicted, the maxRelDeltaVolume is 0.01 which indicates the maximum difference in volume within a price segment is 1%. The fifth configuration parameter, "minDeltaVolume," depicted in line 614, represents a minimum difference in volume that is desired within a control signal segment of the vector representation of the C/V curve. As depicted, the minDeltaVolume is '100.' As will be seen in the discussion of FIGS. 7 and 8, the third, fourth, and fifth configuration parameters can act as termination criteria for recursively partitioning C/V information to produce a representation of a C/V curve. It will be appreciated that the configuration parameters discussed above can be user defined parameters (e.g., through user input), pre-defined parameters (as depicted), dynamically learned parameters (e.g., via machine learning algorithms), programmatically defined parameters, or parameters defined in any number of other ways. It will also be appreciated that the both the values and the termination criteria are merely meant to be illustrative in nature and that any termination criteria and corresponding values could be utilized without departing from the scope of this disclosure.

At line 616, the function 'fTractVolumeVect' is invoked. Function fTractVolumeVect is an illustrative function that can be configured to return a vector of lower volume bounds and a vector of upper volume bounds for a given tactic group based on a control signal value passed thereto. Each of these vectors would include a member for each of the tracts within the tactic group being processed. In this depicted example, fTractVolumeVect is utilized to generate a lower bounds vector for a high control signal value, depicted as 'volumeHighCSLowerBounds' that reflects the estimated lower volume bounds for each tract within the tactic group based on controlSignalHigh. In addition, fTractVolumeVect can generate an upper bounds vector for a high control signal value, depicted as 'volumeHighCSUpperBounds' that reflects the estimated upper volume bounds for each tract based on controlSignalHigh. As can be seen, some of the configuration parameters discussed above in reference to code section 604 are passed as input to fTractVolumeVect. As discussed in greater detail in reference to FIG. 7, these configuration parameters can act as termination criteria for generating the vector of lower volume bounds and the vector of upper volume bounds. Some empty sets/arguments, denoted as '[ ],' are also passed as input to the fTractVolumeVect which will be discussed in greater detail in reference to FIG. 7. In addition, tractEventRateVect, discussed above, is also passed as input. An example of one possible implementation for such a function is depicted by FIG. 7 and discussed in greater detail in reference thereto.

At line 618, a vector volumeLowControlSignalLowerBound is initialized. As can be seen, volumeLowControlSignalLowerBound is initialized utilizing a 'zeros' function in conjunction with a 'length' function. The length function takes a vector as input (e.g., tractEventRateVect) and returns a numerical value that is equivalent to the number of elements in the vector. The zeros function, on the other hand, takes two numerical values as input and generates a vector, populated with zeros, with dimensions defined by the two numerical values. In the depicted example, the zeros function would return a vector having one dimension that is equivalent to the number of elements contained in tractEventRateVect and one dimension that is of length 1. As such, the resulting volumeLowPriceLowerBound vector will be a one-dimensional vector populated with zeros and having the same number of members as the tractEventRateVect.

At line 620, the function 'fTractVolumeVect' is again invoked. In this instance, fTractVolumeVect is utilized to generate a vector 'volumeLowCSLowerBounds' that reflects the lower volume bounds and a vector 'volumeLowCSUpperBounds' that reflects the upper volume bounds based on controlSignalLow. As can be seen, some of the configuration parameters discussed above in reference to code section 604 are passed as input to fTractVolumeVect. As discussed in greater detail in reference to FIG. 7, these configuration parameters can act as termination criteria for generating the vector of lower volume bounds and the vector of upper volume bounds. In addition, volumeLowPriceLowerBound, initialized at line 618 and volumeLowPriceUpperBound, and tractEventRateVect, discussed above, are also passed as input arguments to the fTractVolumeVect.

Code section 622 represents code for generating a representation of a C/V curve. As can be seen, at line 624 the function 'fAdaptiveCVcurve' is invoked. The fAdaptiveCVcurve function can be configured to partition the control signal range (e.g., that defined by controlSignalLow and controlSignalHigh) into control signal segments based on the configuration parameters controlSignalLow, controlSignalHigh, minDeltaControlSignal, maxRelDeltaVolume and minDeltaVolume in conjunction with the upper and lower bound volume vectors produced in lines 616 and 620, discussed above. In some embodiments, these parameters can be utilized by the fAdaptiveCVcurve to generate a representation of a P/V curve such that control signal segments that are included within the vector representation are selected based, at least in part, on a difference in magnitude in estimated volume that occurs across the control signal segment. In some embodiments, fAdaptiveCVcurve can accomplish this by iteratively, or recursively, partitioning the control signal range between controlSignalLow and controlSignalHigh such that control signal segments included within tacticCV.controlSignalSet are determined based on a magnitude of difference in estimated volume across the control signal segments for all tracts of the tactic group being processed. An example of such a function implemented in a recursive manner is depicted in FIG. 8, discussed below, and an example iterative process flow is depicted by FIG. 5. It will be appreciated that once fAdaptiveCVcurve completes processing, that tacticCV.controlSignalSet will include a selection of control signal values within the range from controlSignalLow to controlSignalHigh.

The code included in lines 626-630 is configured to complete the generation of the C/V curve representation. At line 626, controlSignalHigh is added to tacticCV.controlSignalSet to complete the vector of control signal values for the representation of the C/V curve. In addition, at line 628 a sum of the lower bounds for controlSignalHigh is added to tacticCV.volumeSetLowEst to complete the vector of low volume estimates for the C/V curve representation. Likewise, at line 630 a sum of the upper bounds for controlSignalHigh is added to tacticCV.volumeSetHighEst to complete the vector of high volume estimates for the C/V curve representation.

Moving to code section 632, this code section adjusts the vector representation of the control signal/volume curve that was generated at code section 622 based on the principle of monotonicity. It will be appreciated that, as the control signal value increases, the volume would likewise monotonically increase. As such, a control signal/volume curve should be depicted as an increasing staircase. To ensure this representation, the members of the vector tactivCV.volumeSetLowEst and the vector tactivCV.volumeSetHighEst can be iterated through to ensure each value in these vectors is at least greater than a previous value in the vector.

Line 634 begins a loop over vector tacticCV that enforces monotonicity for both the low and high estimates of the volume components of the vector. The looping is controlled by index i, which is incremented by +1 every iteration of the loop. For tacticCV.volumeSetLowEst, conditional line 636, within the loop, iterates from the lower bound of the control signal to the upper bound of the control signal. More specifically, conditional line 636 performs a check for increasing monotonicity in volumeSetLowEst from the lower bound of the control signal to the upper bound of the control signal. If the value for the currently selected volumeSetLowEst(i) is less than the value for the previously selected volumeSetLowEst(i−1), then, to enforce monotonicity, line 638 updates the value of volumeSetLowEst(i) to be equal to that of volumeSetLowEst(i−1).

Figure 9A:
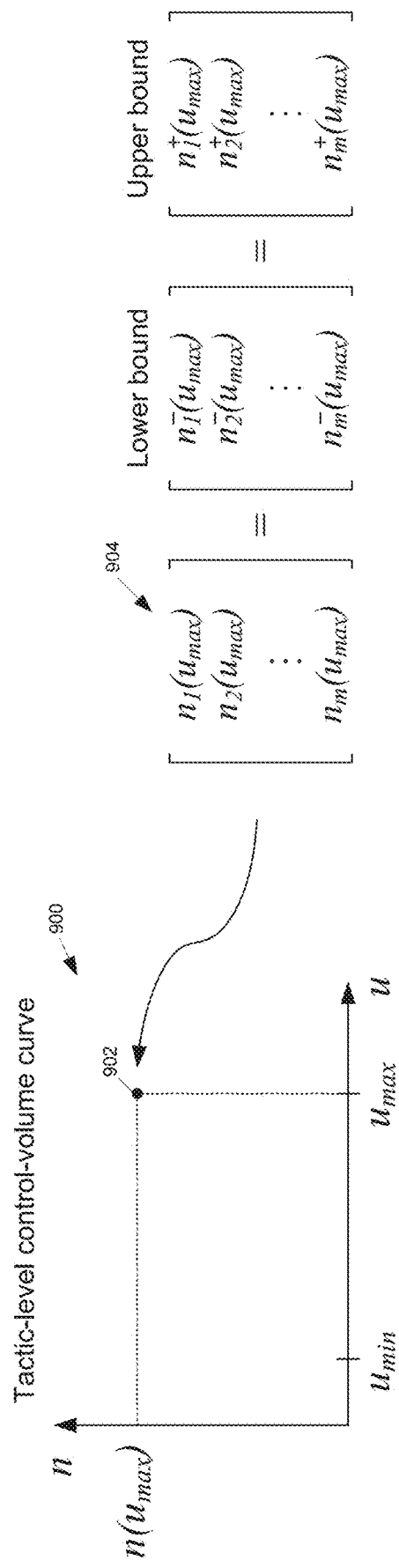
FIGS. 9A-9D depict a graphical representation of a partitioning procedure with respect to C/V information to form a representation of a C/V curve, in accordance with various embodiments of the present disclosure.

In contrast, for tacticCV.volumeSetHighEst, conditional line 642, within the loop, iterates from the upper bound of the control signal to the lower bound of the control signal. More specifically, conditional line 642 performs a check for decreasing monotonicity in volumeSetHighEst from the upper bound of the control signal to the lower bound of the control signal. If the value for the currently selected volumeSetHighEst(end+1−i) is greater than the previously selected volumeSetHighEst(end+2−i), then, to enforce monotonicity, line 644 updates the value of volumeSetHighEst(end+1−i) to be equal to the value of volumeSetHighEst(end+2−i). An example version of this is depicted in FIG. 9D.

FIG. 7 depicts pseudo code for an illustrative fTractVolumeVect function 700, hereinafter function 700 for ease of reference. Function 700 can be utilized in producing a representation of a C/V curve, in accordance with various embodiments of the present disclosure. More particularly, function 700 generates upper bound and lower bound vectors of volume estimates for all tracts within a tactic group. In the depicted embodiment, function 700 produces these estimates for all tracts within the tactic group in accordance with how accurate the tactic group volume needs to be. This is discussed in greater detail in reference to code section 724 below. Function 700 is defined at line 702 where it can be seen that function 700 returns a volumeLowerBound vector and a volumeUpperBound vector. As can be seen, and as described below, the volumeLowerBound vector includes estimated lower volume bounds at a given control signal value (e.g., the tacticControl argument) for each tract in the tactic group being processed. Likewise, the volumeUpper- Bound vector includes estimated upper volume bounds at a given control signal value for each tract in the tactic group being processed. To accomplish this, function 700 takes, as input parameters, the configuration parameters discussed in reference to code section 604 of FIG. 6. Function 700 also takes, as input, additional parameters represented by volumeUpperBoundInit, volumeUpperBoundInit, tacticControl, and tractEventRateVect. Recall that each of the volumeUpperBoundInit and volumeLowerBoundInit were passed as as empty sets/arguments in line 616 of FIG. 6. Also in line 616, tacticControl was passed as controlSignalHigh. In addition volumeUpperBoundInit was passed as volumeLowCSLowerBound, at line 620 of FIG. 6 and tacticControl was passed as controlSignalLow.

At line 706, a variable nbrOfTracts is initialized to the length of tractEventRateVect, discussed in greater detail above. It will be appreciated that nbrOfTracts represents the number of tracts included in a tactic group being processed.

Moving to line 708, it will be appreciated that line 708 initiates an 'if' block that, when satisfied, results in the body of the 'if' block, represented by code section 710, being executed. As can be seen, line 708 includes a single condition represented by 'isempty(volumeLowerBoundInit).' The 'isempty' function returns true if the variable passed to the isempty function is empty, or has yet to be populated, and false if the variable is not empty, or has been populated. As such, if volumeLowerBoundInit has not been populated (e.g., as passed in line 616 of FIG. 6, then the processing proceeds to line 712 where volumeLowerBound is initialized to a one-dimensional vector of zeros having a length equal to that of the number of tracts within the tactic group being processed.

At line 714, a 'for' loop is initiated that will iterate through the tracts utilizing an index 'i.' Index 'i' will be incremented by 1 for each iteration from an initial value of 1 up to a value corresponding to the number of tracts within the tactic group being processed. At each iteration, line 716 will be executed. Line 716 utilizes function fTractVolume to return and assign a volume value to a member of the volumeLowerBound vector for a corresponding tract associated with index i. The function fTractVolume is configured to return a volume for a tract identifier, passed as the first argument, at a determined price passed as the second argument. As mentioned previously, the price for each tract of the tactic group can be based, for example, on a product of the event rate estimate for each of the tracts and a selected control signal value. It will be appreciated that this is merely meant to be illustrative and that other mechanisms can be utilized to map a control signal value to a respective price for each tract without departing from the scope of this disclosure, It will also be appreciate that the mechanism selected for generating the mapping of control signal to price for a tract of a tactic group will be the same as that utilized by an actuator (e.g., actuator 320 of FIG. 3).

Code section 710 ends with line 720 where the volumeUpperBound vector is set to equal the volumeLowerBound vector that was populated by the above discussed for loop represented by lines 714-718. In the event code section 710 is executed, once completed, execution would proceed to line 770 where the if block initiated at line 708 end, followed by the end of function 700 at line 772.

In the event the condition of the 'if' block at line 708 is not satisfied, the processing would proceed to the 'else' block that is initiated at line 722. The 'else' block encompasses code section 724. It will be appreciated that the else block would be executed, for example, in response to line 620 of FIG. 6. Line 726 sets volumeLowerBound equal to the volumeLowerBoundInit vector passed as an argument in invoking function 700. Likewise, line 728 sets volumeUpperBound equal to the volumeUpperBoundInit vector passed as an argument in invoking function 700. At line 730 a variable DeltaVect is initialized by taking a difference between volumeUpperBound and volumeLowerBound. It will be appreciated that this is accomplished in a memberwise fashion such that DeltaVect results in a vector including a member for tract of the tactic group that includes a value denoting the volume difference between volumeUpperBound and volumeLowerBound of the respective tract. At line 734 a variable totDeltaVolume is determined by summing the members of DeltaVect. Moving to line 734, a variable minTotVolume is determined by summing the volumeLowerBound members. As such, theis minTotVolume represents an estimated minimum volume that would be awarded at the control signal being processed (e.g., tacticControl). The variable indexVect is then initialized at line 736 to be equal to the indexes of DeltaVect sorted in descending order (e.g., from largest volume difference to lowest volume difference).

At line 738 an index variable 'i' is initialized to zero. Line 740 initializes a while loop having conditions 742 and 746. Because condition 742 and 746 are separated by a logical 'or' operator 744, if either 742 or 746 evaluate to true, then the body of the while loop, depicted by code section 752, will be executed. As can be seen, condition 742 evaluates to true if the minimum total volume (e.g., minTotVolume) for the tactic group is equal to zero and the total difference (e.g., totDeltaVolume) in volume for the tactic group is greater than the desired minimum difference in volume (e.g., minDeltaVolume). Condition 746 evaluates to true if the ratio of the total difference in volume (e.g., totDeltaVolume) for the tactic group to the minimum total volume (e.g., minTotVolume) for the tactic group plus one is greater than the desired maximum relative volume (e.g., maxRelDeltaVolume) and the total difference in volume for the tactic group (e.g., totDeltaVolume) is greater than the desired minimum difference in volume (e.g., minDeltaVolume).

If neither of conditions 742 or 746 is satisfied, then the volume estimates for the tactic group satisfy the desired accuracy and termination criteria and processing proceeds to 768 where the while loop is terminated, then line 770 where the 'if' block is terminated, and finally 772 where function 700 end, and processing is returned to the function that called function 700. If, however, either of conditions 742 or 746 is satisfied, then the processing proceeds to code block 752.

Code block 752 acts to query the volume for the tract with the largest difference in volume to determine a more exact estimated volume for the tactic group. It will be appreciated from a review of the while loop initiated at line 740, that the while loop will iterate through indexVect querying the volume for each associated tract until the criteria defined by conditions 742 or 746 is met. This is accomplished by initially incrementing index 'i' at line 754. At line 756, the function fTractVolume is utilized to query the volume for the tract at indexVect(i) based, for example, on the associated price defined by the combination of the control signal value and an estimated event rate for the tract (e.g., tractEventRateVect(indexVect(i))). It will be appreciated that this is merely meant to be illustrative and that other mechanisms can be utilized to map a control signal value to a respective price for each tract without departing from the scope of this disclosure, It will also be appreciate that the mechanism selected for generating the mapping of control signal to price for a tract of a tactic group will be the same as that utilized by an actuator (e.g., actuator 320 of FIG. 3).

At line 758, the estimated volume lower bound for the tract is then substracted from minTotVolume and the more accurate estimate contained within tractVolume is added. This essentially replaces the estimated volume lower bound for the tract with the more accurate estimate produced at line within the minTotVolume. At line 760, the difference in volume attributed to the tract being processed (e.g., DeltaVect(indexVect(i))) is subtracted from totDeltaVolume, thus removing this tracts difference in volume from the total. The difference in volume attributed to the tract being processed is then set to zero at line 762. Because an accurate estimate for the volume of the tract being processed has been determined at line 756, the estimated lower bound of volume and the estimated upper bound of volume for the tract are then both set to equal the more accurate estimated volume at lines 764 and 766. Processing then proceeds to line 768 where the while loop is terminated, then line 770 where the 'if' block is terminated, and finally line 772 where function 700 end, and processing is returned to the function that called function 700.

FIG. 8 depicts pseudo code for an illustrative fAdaptiveCVcurve function 800, hereinafter function 800 for ease of reference. Function 800 can be utilized in producing a representation of a C/V curve, in accordance with various embodiments of the present disclosure. A current control segment will be referred to in describing the processing of function 800. It will be appreciated that a current control segment in this context refers to a control segment currently being processed by function 800.

Function 800 is defined at line 802 where it can be seen that function 800 generates a vector, tacticCV, that defines the representation of the C/V curve. As discussed in greater detail below, tacticCV includes a vector of control signal values (e.g., controlSignalSet), a vector of low volume estimates (e.g., volumeSetLowEst) for each control signal value, and a vector of high volume estimates (e.g., volumeSetHighEst) for each control signal value. To produce this representation of a C/V curve, function 800 takes, as input parameters: the tacticCV object; a tacticControlLow numeric value representing a low control signal for a current control segment being processed, a volumeLowCSLowerBound vector including an estimated lower bound of volume, for each tract within the tactic group being processed, at the low control signal for the current control segment; a volumeLowCSUpperBound vector including an estimated lower bound of volume, for each tract within the tactic group being processed, at the low control signal for the current control segment; a tacticControlHigh numeric value representing a high control signal for the current control segment; a volumeHighCSLowerBound vector including an estimated lower bound of volume, for each tract within the tactic group being processed, at the high control signal for the current control segment; a volumeHighCSUpperBound vector including an estimated upper bound of volume, for each tract within the tactic group being processed, at the high control signal for the current control segment; a tractEventRateVect vector; minDeltaControlSignal; maxRelDeltaVolume; and minDeltaVolume. Each of the last four parameters are discussed in greater detail above.

At line 804 an 'if' block is initiated. The body of the 'if' block is executed if the criteria defined in line 804 is satisfied (i.e., true), otherwise it will be appreciated that the processing of code section 806 is skipped. As such, code section 806 will only be executed if tacticCV is empty and therefore needs to be initialized. If tacticCV is empty, then tacticCV is initialized by adding tacticControlLow to the controlSignalSet of tacticCV at line 808. In addition, a sum of volumeLowCSLowerBound is added to volumeSetLowEst of tacticCV and a sum of volumeLowCSUpperBound is added to volumeSetHighEst of tacticCV at lines 810 and 812, respectively. At line 814, the 'if' block is terminated.

Lines 816-822 initialize variables for processing the current control segment to be utilized in determining if the current control segment satisfies certain termination criteria. To this end, at line 816, a variable volumeLow is initialized to be equal to a sum of the members of the lower bound volume estimate for the low control signal of the current control segment. As such, volumeLow reflects a minimum anticipated volume for the tactic group at the low control signal of the of the current control segment. Likewise, at line 818, a variable volumeHigh is initialized to be equal to a sum of the members of the upper bound volume estimate for the high control signal of the current control segment. As such, volumeHigh reflects a maximum anticipated volume for the tactic group at the high control signal of the of the current control segment. At line 820 a difference in control signal across the current control segment is determined by taking the difference between the high control signal of the current segment (e.g., tacticControlHigh) and subtracting the low control signal of the current segment (e.g., tacticControlLow) and assigning the resulting value to variable deltaControlSignal. At line 822 a difference in volume of a target event across the current control segment is determined by taking the difference between the maximum anticipated volume for the high control signal of the current segment (e.g., volumeHigh) and subtracting the minimum anticipated volume for the low control signal of the current segment (e.g., volumeLow) and assigning the resulting value to variable deltaVolume.

At line 824 an if/else block is initiated. If the conditions defined at line 824 are satisfied then the body of the 'if' block, represented by code section 832 is executed. If, however, the conditions at line 824 are not satisfied, then the body of the else block, represented by lines code section 842 is executed.

As can be seen, line 824 includes three alternative conditions represented by 826, 828, and 830 joined by logical 'or' operators. As such, if any of conditions 826, 828, or 830 are met, processing would proceed to code section 832 where processing of the current control segment is terminated. As such, conditions 826, 828, and 830 can be referred to as termination criteria. It will be appreciated that the depicted conditions are merely meant to be illustrative and that additional or fewer conditions and/or criteria for each condition can be utilized without departing from the scope of this disclosure. Code section 832 begins at line 834 where a low control signal value for the current control segment is added to the controlSignalSet of the tacticCV object. Moving to line 836, a sum of the lower bound volume estimates for the low control signal value is added to the volumeSetLowEst vector of the tacticCV object. At line 838, a sum of the upper bound volume estimates for the low control signal value is added to the volumeSetHighEst vector of the tacticCV object. After execution of line 838, processing would proceed to line 852 where the if/else block is terminated, followed by line 854 where function 800 ends and the resulting tacticCV is passed back to the function which called function 800.

If none of conditions 826, 828, or 830 are met then the current control segment does not satisfy the termination criteria and processing can proceed to code section 842. At line 844 a variable 'tacticControlMid' is set to the midpoint between the low control signal value of the current segment (e.g., tacticControlLow) and the high control signal value of the current segment (e.g., tacticControlHigh). For example, if tacticControlLow is 0 and tacticControlHigh is 1, then tacticControlMid would be 0.5. At line 846, function fTractVolumeVect, discussed in reference to FIG. 6 and FIG. 7 is called to determine an estimated lower and upper volume bound (e.g., volumeMidCSLowerBound and volumeMidCSUpperBound, respectively) for the tacticControlMid control signal value.

At line 848, function 800 is recursively called where the tacticControlLow is maintained, however tacticControlMid is now passed in place of tacticControlHigh. As such, the current control segment is divided, or partitioned, into a first control segment from tacticControlLow to tacticControlMid, and this first segment is passed back into function 800 to have the above described analysis performed again.

Similar to line 848, at line 850, function 800 is again recursively called. In this instance, however, tacticControlHigh is maintained and tacticControlMid is now passed in place of tacticControlLow. As such, the current control segment is divided into a second control segment from tacticControlMid to tacticControlHigh, and this second segment is passed back into function 800 to have the above described analysis performed again.

It will be appreciated that the recursive processing will continue to partition the control signal range initially passed into function 800 by main function 600 of FIG. 6 until one of conditions 826, 828, or 830 evaluate to true. It will also be appreciated that, for each recursive call another member would be added to each of the controlSignalSet, volumeSetLowEst, and volumeSetHighEst by code section 832.

FIGS. 9A-D represent a graphical depiction of a partitioning process, with respect to control signal and volume information, to form a representation of a C/V curve, in accordance with various embodiments of the present disclosure. Beginning with FIG. 9A, graph 900 represents an illustrative C/V graph for a tactic group where the horizontal axis represents control signal values and the vertical axis represents volume. As can be seen an initial control range, or segment, for the tactic group is depicted by low control signal value, $u_{min}$, and high control signal value, $u_{max}$. Utilizing $u_{max}$ a maximum anticipated volume (e.g., point 902) for the tactic group is determined. As depicted, the tactic group comprises tracts 1-$m$. To accomplish this, at 904, an estimated upper bounds of volume for each tract at the high control signal is determined. Such a determination could be made, for example, by fTractVolumeVect discussed in reference to FIGS. 6-8. The sum of the estimated upper bounds for all tracts within the tactic group represents the maximum anticipated volume for the tactic group, which is represented as point 902 on graph 900.

Figure 9B:
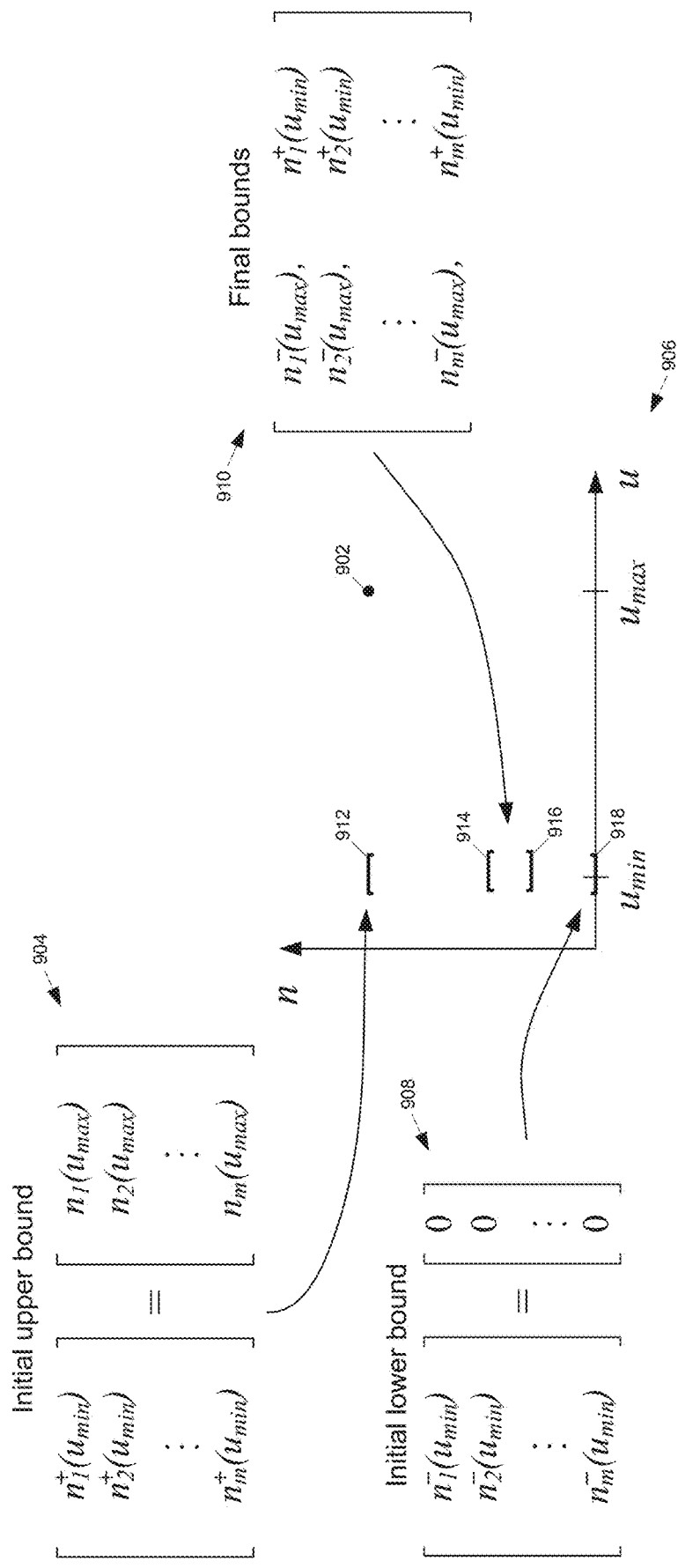

Moving to FIG. 9B, an initial estimate of the lower bounds of volume for the low control signal value can initially be assumed to be 0, as depicted in vector 908 and bracket 918 on graph 906. An initial estimate of the upper bounds of volume for the low control signal value can initially be assumed to be equal to the maximum anticipated volume, as depicted in vector 904 and bracket 912 on graph 906. From these estimated bounds, those tracts of the tactic group that contribute the most to the maximum anticipated volume can be iteratively queried to tighten the estimated upper and lower volume bounds until a desired level of accuracy is achieved. The result of such a process is depicted by vector 910 and bracket 916 depicting the resulting lower volume bound at the low control signal value and bracket 914 depicting the resulting upper volume bound at the low control signal value. It will be appreciated that, at the low control signal value, the tactic group can anticipate being awarded a volume that would fall between bracket 916 and 914. As such, the actual C/V curve at the low control signal value would fall within the range defined by bracket 916 and 914.

Figure 9C:
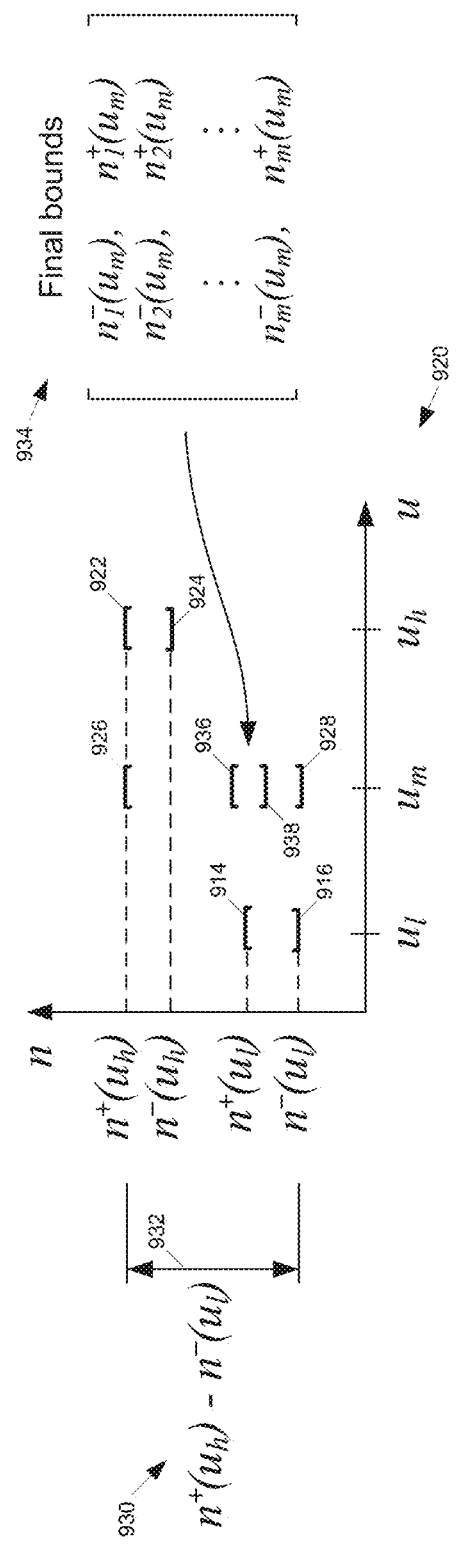
Figure 9D:
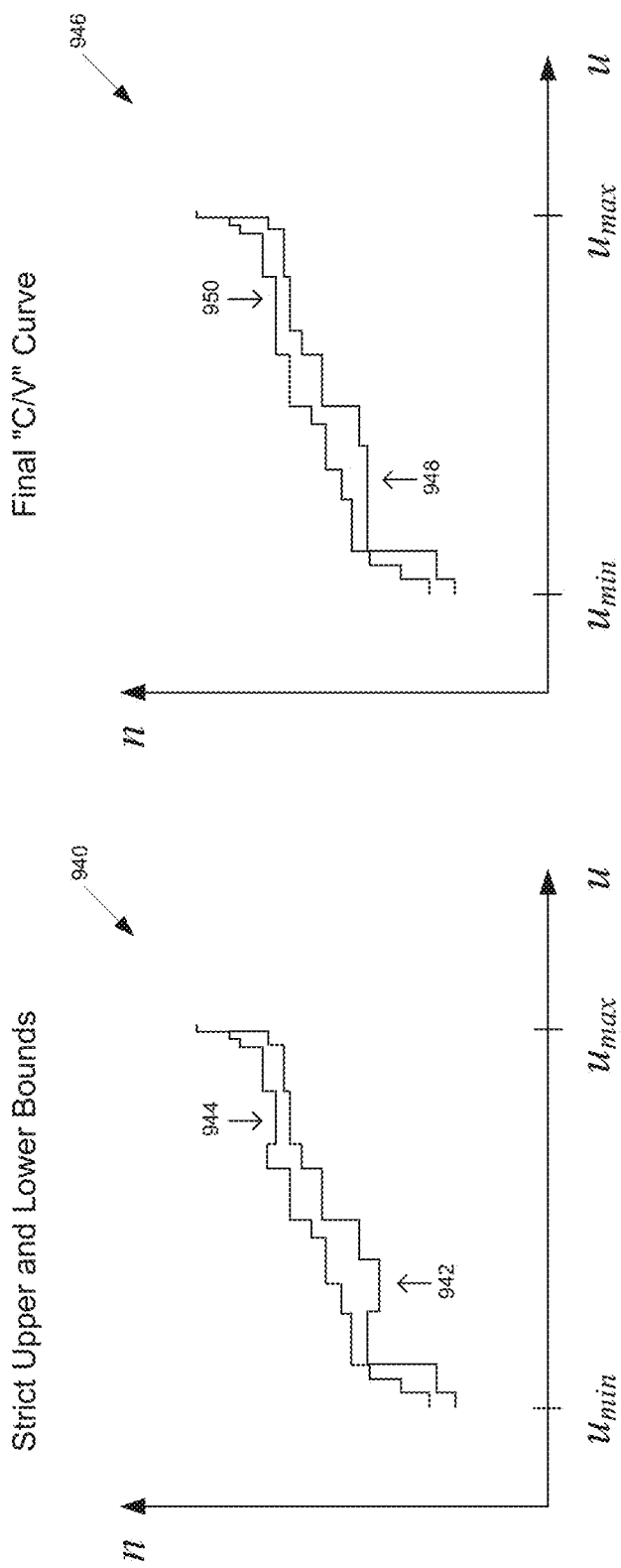

FIG. 9C depicts the actual partitioning of an illustrative control segment. Because this control segment could be the same control segment depicted in FIG. 9A or 9B, or a sub-segment of the control segment of FIG. 9A or 9B, the depicted control segment reflects $u_l$ and $u_h$ as the low control signal value and the high control signal value, respectively. As can be seen, a range in volume (e.g., range 932) between the low control signal value and the high control signal value of the control segment can be determined by taking the estimated lower bounds of volume for the low control signal value and subtracting this from the estimated upper bounds of volume for the high control signal value as depicted at 930. If this range of volume does not satisfy predetermined termination criteria, such as that discussed in reference to FIG. 8 above, then the control segment can be partitioned into two control segments by selecting, for example, a midpoint (e.g., $u_{mid}$) between the low control signal and the high control signal value.

It will be appreciated that, as discussed in reference to FIG. 9B, an initial estimate of the lower bounds of volume at the midpoint can initially be assumed to be the estimated lower bounds of volume at the low control signal value, as depicted by bracket 928 on graph 920. An initial estimate of the upper bounds of volume at the midpoint value can initially be assumed to be equal to the estimated upper bounds of volume at the high control signal value as depicted by bracket 926. From these estimated bounds, those tracts of the tactic group that contribute the most to the upper bounds of anticipated volume can be iteratively queried to tighten the estimated upper and lower volume bounds until a desired level of accuracy is achieved. The result of such a process is depicted by vector 934 and bracket 938 depicting the resulting lower volume bound at the midpoint signal value and bracket 936 depicting the resulting upper volume bound at the midpoint signal value. From this point the partitioning can continue by processing the control segment defined by the low control signal value and the midpoint control signal value and the control segment defined by the midpoint control signal value and the high control signal value.

FIG. 9D depicts an optional step of utilizing the principle of monotonicity to refine the representation of the C/V curve produced through FIGS. 9A-9C. As the control signal increases, the volume will also increase. To put it in other words, the volume will not decrease due to an increase in the control signal. Because of this, the resulting representation of the C/V curve can be considered monotonic, or never decreasing. As such, if the upper or lower volume bound of a current control segment of the representation of the C/V curve is than that of a prior segment of the representation of the C/V curve, then the reduced value for the current control segment can be set to equal the corresponding value of the previous control segment. As can be seen in graph 940, the lower volume bound reduces at 942. Likewise, the upper volume bound reduces at 944. A refined version of graph 940 is depicted in graph 946, where the principle of monotonicity is utilized to adjust these reduced values as depicted at 948 and 950.

Figure 10:
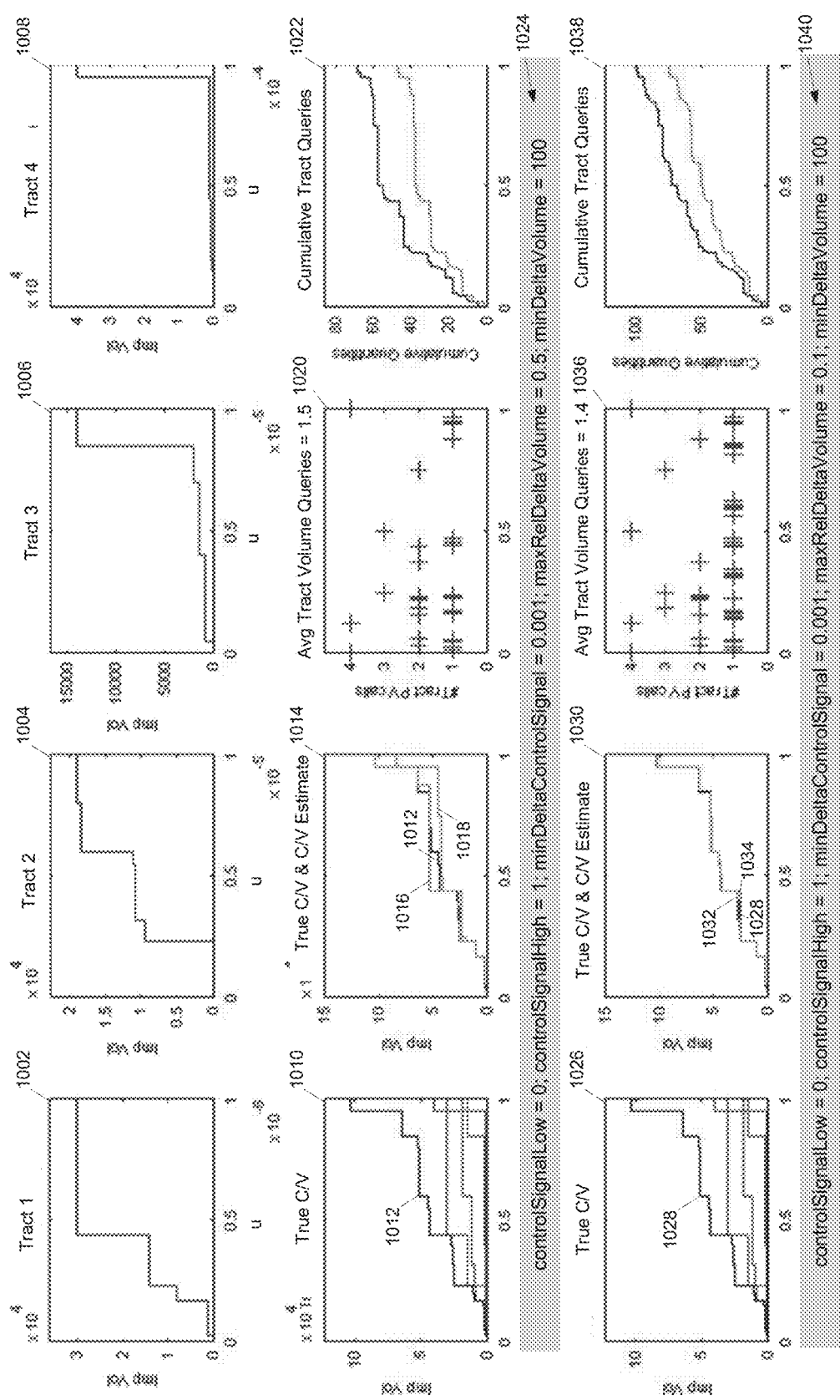
FIG. 10 depicts illustrative graphs, in accordance with various embodiments of the present disclosure.

FIG. 10 depicts an array of graphs that illustrate actual C/V curves for tracts within a tactic group, actual C/V curves for a tactic group as a whole, and representations of C/V curves, in accordance with various embodiments of the present disclosure. Graphs 1002-1008 depict C/V curves for four different tracts of a tactic group. As a reminder, each tract defines a segment of an target audience for the tactic group. Each of graphs 1002-1008 depict a control signal across the horizontal axis and volume along the vertical axis.

Graphs 1010, 1014, 1022, and 1024 depict various aspects of an actual C/V curve and a representation of a C/V curve, derived in accordance with various embodiments described herein. The actual C/V curve and the representation of the C/V curve depict the tactic group that comprises tracts 1-4, discussed above. Graph 1010 depicts an actual C/V curve 1012 for the tactic group as a whole. It will be appreciated that the volume reflected in C/V curve 1012 is a sum of the volumes of each tract that comprises the tactic group. Graph 1014 depicts the actual C/V curve 1012 in relation to the estimated upper bounds of volume 1016 and estimated lower bounds 1018 of volume of the representation of the C/V curve. The representation of the C/V curve is derived in accordance with configuration parameters 1024. As can be seen, the actual C/V curve is encompassed within the representation of the C/V curve. Graph 1020 depicts the occurrences of tract volume queries in relation to the number of control segments included within the representation of the C/V curve. As can be seen, for each control segment included within the representation of the C/V curve an average of 1.5 tract volume queries were executed. Graph 1022 depicts a cumulative count of the tract level queries in relation to the control signal. It should be noted that, with a fixed width of 0.001 for control signal segments between 0 and 1, and C/V queries of each tract at each control signal segment, the number of C/V queries would have been 1,000 queries per tract×4 tracts for a total of 4,000 queries. The adaptive scheme reduces the number of tract level queries to 72 resulting in a 98.2% increase in processing efficiency, not to mention the bandwidth gains that are achieved by reducing the amount of data to such a degree.

Graphs 1026, 1030, 1036, and 1038 depict various aspects of an actual C/V curve and a representation of a C/V curve, derived in accordance with various embodiments described herein. The actual C/V curve and the representation of the C/V curve again depict the tactic group that comprises tracts 1-4, discussed above. It should be noted however, that the configuration parameters for the representation of the C/V curve have been changed to reflect a maxRelDeltaVolume of 0.1. Graph 1026 depicts an actual C/V curve 1028 for the tactic group as a whole. As can be seen, graph 1026 mirrors graph 1010 because both graphs represent the same depiction. Graph 1030 depicts the actual C/V curve 1028 in relation to the estimated upper bounds of volume 1032 and estimated lower bounds 1034 of volume of the representation of the C/V curve. The representation of the C/V curve is derived in accordance with configuration parameters 1040. As can be seen, the actual C/V curve is encompassed within the representation of the C/V curve, however, because of the change to the maxRelDeltaVolume, the representation of the C/V curve fits more closely to the actual C/V curve, to the point that in many areas the different curves are indiscernible. Graph 1036 depicts the occurrences of tract volume queries in relation to the number of control segments included within the representation of the C/V curve. As can be seen, for each control segment included within the representation of the C/V curve an average of 1.4 tract volume queries were executed. Graph 1038 depicts a cumulative count of the tract level queries in relation to the control signal. As mentioned above, with fixed width of 0.001 for control signal segments between 0 and 1, and C/V queries of each tract at each control signal segment, the number of C/V queries would have been 1,000 queries per tract×4 tracts for a total of 4,000 queries. The adaptive scheme reduces the number of tract level queries to 103 resulting in a 97.4% increase in processing efficiency, not to mention the bandwidth gains that are achieved by reducing the amount of data to such a degree.

Figure 11:
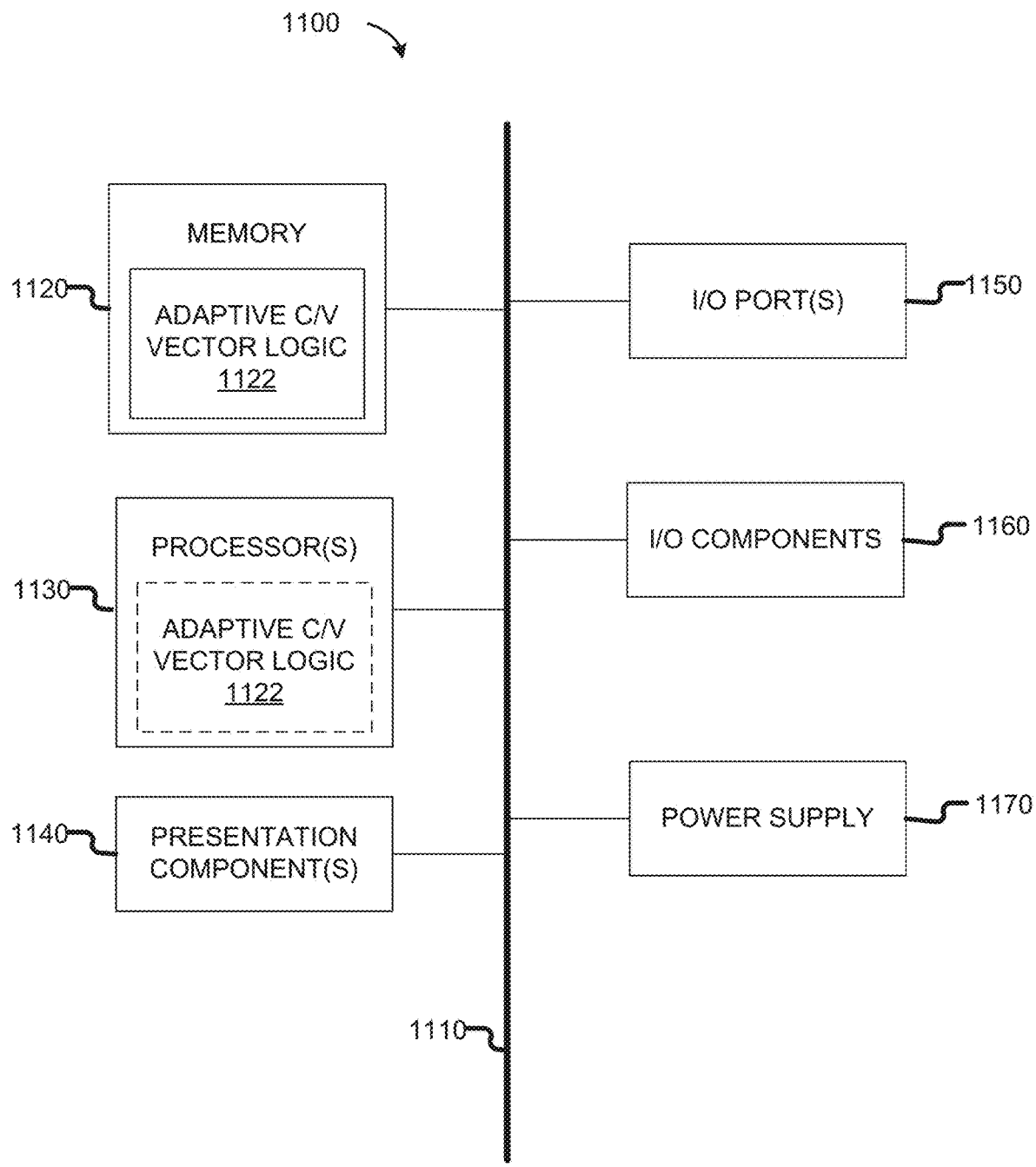
FIG. 11 is a block diagram of an example computing device in which various embodiments of the present disclosure may be employed.

Having described embodiments of the present invention, an example operating environment in which embodiments of the present invention may be implemented is described below in order to provide a general context for various aspects of the present invention. Referring to FIG. 11, an illustrative operating environment, or computing platform, for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1120, one or more processors 1130, one or more presentation components 1140, input/output (I/O) ports 1150, I/O components 1160, and an illustrative power supply 1170. Bus 1110 represents what may be one or more busses (such as an address bus, data bus, or combination thereof). Although depicted in FIG. 11, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 1140 while also being one of the I/O components 1160. As another example, processors have memory integrated therewith in the form of cache; however, there is no overlap between the one or more processors 1130 and the memory 1120. A person of ordinary skill in the art will readily recognize that such is the nature of the art, and it is reiterated that the diagram of FIG. 11 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 1100 of FIG. 11 and any other reference to "computing device," unless the context clearly indicates otherwise.

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1120 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 1100 includes one or more processors 1130 that read data from various entities such as memory 1120 or I/O components 1160. Presentation component(s) 1140 present data indications to a user or other device. Illustrative presentation components include a display device, speaker, printing component, vibrating component, etc.

In various embodiments, memory 1120 includes, in particular, temporal and/or persistent copies of adaptive C/V vector logic 1122. Adaptive C/V vector logic 1122 includes instructions that, when executed by one or more processors 1130, result in computing device 1100 performing any of the processes and/or actions described above in reference to adaptive C/V vector generator 118 of FIGS. 1 & 2, adaptive C/V vector generator 370 of FIG. 3, process flow 400 of FIG. 4, process flow 500 of FIG. 5, and/or any functionality depicted in FIGS. 6-8.

In some embodiments, one or more processors 1130 may be packaged together with adaptive C/V vector logic 1122. In some embodiments, one or more processors 1130 may be packaged together with adaptive C/V vector logic 1122 to form a System in Package (SiP). In some embodiments, one or more processors 1130 can be integrated on the same die with adaptive C/V vector logic 1122. In some embodiments, processor 1130 can be integrated on the same die with adaptive C/V vector logic 1122 to form a System on Chip (SoC).

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method comprising:
   receiving, from a control system, a request for control/volume relationship information of a target event for a tactic group;
   in response to receiving the request, automatically generating a representation of a control/volume curve of the target event for the tactic group, the representation of the control/volume curve including a plurality of control signal segments, such that control signal segments included within the representation of the control/volume curve are determined based, at least in part, on one or more configuration parameters; and
   transmitting the representation of the control/volume curve to the control system to enable the control system to be initialized.

2. The computer-implemented method of claim 1, wherein the one or more configuration parameters include a minimum change in control signal across a first control signal segment.

3. The computer-implemented method of claim 1, wherein the one or more configuration parameters include one or more of:

a maximum relative difference in volume that is desired within a first control signal segment; or a minimum difference in volume that is desired within a second control signal segment.

4. The computer-implemented method of claim 1, further comprising determining a plurality of tracts of the tactic group.

5. The computer-implemented method of claim 4, further comprising:
calculating a difference in volume for each tract based, at least in part, on an estimated lower volume bound for each tract and an estimated upper volume bound for each tract; and
sorting the plurality of tracts based, at least in part, on a magnitude of the difference in volume of each tract.

6. The computer-implemented method of claim 1, wherein the representation of the control/volume curve includes a control signal value and volume information for each control signal segment of the plurality of control signal segments.

7. The computer-implemented method of claim 6, wherein the volume information includes a high volume estimate and a low volume estimate for at least one control segment.

8. The computer-implemented method of claim 6, wherein the control signal value and spend information are stored in vector form.

9. One or more computer-readable storage media having instructions embodied thereon which, when executed by one or more processors, cause the one or more processors to:
receive, from a control system, a request for control/volume relationship information of a target event for a tactic group;
automatically generate, in response to receipt of the request, a representation of a control/volume curve of the target event for the tactic group, the representation of the control/volume curve including a plurality of control signal segments, such that control signal segments included within the representation of the control/volume curve are determined based, at least in part, on one or more configuration parameters; and
transmit the representation of the control/volume curve to the control system to enable the control system to be initialized.

10. The one or more computer-readable storage media of claim 9, wherein the one or more configuration parameters include a maximum relative difference in volume that is desired within a first control signal segment.

11. The one or more computer-readable storage media of claim 9, wherein the one or more configuration parameters include one or more of:
a minimum change in control signal across a first control signal segment; or
a minimum difference in volume that is desired within a second control signal segment.

12. The one or more computer-readable storage media of claim 9, wherein the instructions further cause the one or more processors to determine a plurality of tracts of the tactic group.

13. The one or more computer-readable storage media of claim 12, wherein the instructions further cause the one or more processors to:
calculate a difference in volume for each tract based, at least in part, on an estimated lower volume bound for each tract and an estimated upper volume bound for each tract; and
sort the plurality of tracts based, at least in part, on a magnitude of the difference in volume of each tract.

14. The one or more computer-readable storage media of claim 9, wherein the representation of the control/volume curve includes a control signal value and volume information for each control signal segment of the plurality of control signal segments.

15. The one or more computer-readable storage media of claim 14, wherein the volume information includes a high volume estimate and a low volume estimate for at least one control segment.

16. A system, comprising:
one or more processors; and
memory, coupled with the one or more processors, having instructions stored thereon, which, when executed by the one or more processors cause the one or more processors to:
receive, from a control system, a request for control/volume relationship information of a target event for a tactic group;
automatically generate, in response to receipt of the request, a representation of a control/volume curve of the target event for the tactic group, the representation of the control/volume curve including a plurality of control signal segments, such that control signal segments included within the representation of the control/volume curve are determined based, at least in part, on one or more configuration parameters; and
transmit the representation of the control/volume curve to the control system to enable the control system to be initialized.

17. The system of claim 16, wherein the one or more configuration parameters include a minimum difference in volume that is desired within a first control signal segment.

18. The system of claim 16, wherein the one or more configuration parameters include one or more of:
a minimum change in control signal across a first control signal segment; or
a maximum relative difference in volume that is desired within a second control signal segment.

19. The system of claim 16, wherein the instructions further cause the one or more processors to determine a plurality of tracts of the tactic group.

20. The system of claim 19, wherein the instructions further cause the one or more processors to:
calculate a difference in volume for each tract based, at least in part, on an estimated lower volume bound for each tract and an estimated upper volume bound for each tract; and
sort the plurality of tracts based, at least in part, on a magnitude of the difference in volume of each tract.

* * * * *